United States Patent [19]
Kinuhata et al.

[11] Patent Number: 5,193,600
[45] Date of Patent: * Mar. 16, 1993

[54] TIRE GROOVING APPARATUS AND METHOD

[75] Inventors: Satoru Kinuhata, Kobe; Seiki Yamada, Ibaraki, both of Japan

[73] Assignee: Sumitomo Rubber Industries, Ltd., Hyogo, Japan

[*] Notice: The portion of the term of this patent subsequent to Apr. 9, 2008 has been disclaimed.

[21] Appl. No.: 720,685

[22] Filed: Jun. 25, 1991

Related U.S. Application Data

[62] Division of Ser. No. 474,760, Mar. 26, 1990, Pat. No. 5,144,996.

[30] Foreign Application Priority Data

Jul. 28, 1988 [JP] Japan .................. 63-189952

[51] Int. Cl.⁵ .............................................. B29D 30/68
[52] U.S. Cl. ..................................................... 157/13
[58] Field of Search ........................................... 157/13

[56] References Cited

U.S. PATENT DOCUMENTS 5,005,628  4/1991  Kinuhata et al. ................... 157/13

FOREIGN PATENT DOCUMENTS 48-55486    8/1973  Japan .
59-215849  12/1984  Japan .
63-54240    3/1988  Japan .

Primary Examiner—James G. Smith

[57] ABSTRACT

A tire grooving apparatus according to the present invention consists of a movable block (5) movable at least in a lateral direction parallel with a tire support shaft, a vertically movable block (7) provided on the movable blocks, and a pivotable arm (81) provided on the block (7) and having a cutter support device (9) at the free end portion thereof, characterized in that the apparatus is further provided with a center deviation detector (13) for detecting a deviation of center line of a tire tread surface, or both the center deviation detector (13) and a lateral runout detector (14). A tire grooving method according to the present invention is characterized in that an actual measurement obtained by the center deviation detector (13), or both an actual measurement obtained by the center deviation detector (13) and an actual measurement obtained by the lateral runout detector (14) are utilized for the correction of the quantity of movement of a cutter (10).

5 Claims, 24 Drawing Sheets

TIRE GROOVING APPARATUS AND METHOD

This application is a divisional of copending application Ser. No. 07/474,760, now U.S. Pat. No. 5,144,996 filed on Mar. 26, 1990, the entire contents of which are hereby incorporated by reference.

TECHNICAL FIELD OF THE INVENTION

The present invention relates to a tire grooving apparatus and method wherein lateral runout and center deviation or only center deviation are detected and thereby the cutting position of a cutter can be corrected.

BACKGROUND OF THE INVENTION

Conventionally, the work of grooving a tire for trial manufacturing and limited scale production, namely carving the tread pattern grooves in a plain cured tire without any tread pattern is generally performed by means of a hand cutter, requiring skill and a lot of time.

Taking the above-mentioned problem into consideration, the present applicant has proposed a tire grooving apparatus, as shown in FIG. 32, having, as main constructive features, a cutting device attached to a vertically movable carriage, which is moved in parallel and perpendicular directions against the tire support shaft; a pivotable arm support shaft which is extended from the carriage; a pivotable arm attached to the support shaft; a cutter holder which is pivotably attached to the pivotable arm perpendicular to the axis thereof; a cutter which is held by the end portion of the cutter holder; and the cutting position of the cutter arranged to be on the extended axis of the support shaft (Japanese Unexamined Patent Publication No. 54240/1988 and 177232/1986).

In the present specification, the cutting position of the cutter refers to a peculiar point of the cutter which is a certain distance (M) (including zero) from the bottom end of the cutter holder (refer to FIG. 1).

Carving of tread pattern grooves for a plain tire by the tire grooving apparatus is carried out by setting the cutting position of the cutter to the tangential line (Processing Standard Point for Tread) of a plain tire. Thus, since the cutting position of the cutter is maintained on the extended axis of the pivotable arm support shaft, namely on the tangential line of the plain tire, calculation of quantity of movement of the movable carriage and the pivotable arm becomes simple, the programming of computer programs becomes easy and accurate grooving becomes possible.

However, when lateral runout in the tire-width direction caused by strain of the tire itself or deviation of the tire support occurs, even if grooving is carried out by the cutter of which movement is controlled by a computer program so as to carve the prescribed tread pattern while the tire is rotated, the position of grooves from the tread center of tires of the same size and specification differs for each tire and positions of grooves which ought to be on right and left sides of the tread center C (the tire equator) are different for each groove when a plurality of grooves are carved in a tire, so that quality problems arise such as variations in tire quality and decreased strength.

To solve these problems, the present applicant has provided a tire grooving apparatus and method, wherein the lateral runout of the tire is detected and the cutting position of the cutter is corrected in accordance with detected value.

However, even if the same kind of tires are attached to the tire supporting shaft of the tire grooving apparatus in the same way, the tread center position does not always coincide with the theoretical tread center position set by the standard program for each tire and slight deviation sometimes occurs because of the difference in dimensions on the right and left sides of the tire which arise during curing, deformation caused by inner pressure, the improper engagement with a rim and like.

Accordingly, as shown in FIG. 19, the quantity y of lateral runout on the side of the tire is not always equal to the quantity of actual deviation of tread center TC to the tread center PC set by the standard program. Therefore, even if the lateral runout on the side of the tire is detected and the position of the cutter is corrected with the detected value (the cutter is moved to follow the lateral runout) and thereby the grooving is performed, the position to be cut cannot be set to a prescribed distance from the tread center of the tire. Finally, the position of tread grooves from the tread center TC does not coincide with each tire of the same kind.

Taking the above-mentioned problems of the conventional art into consideration, it is an object of the present invention to provide a tire grooving apparatus and method wherein position of the cutter is corrected such that for any position of tread grooves from the tread center, coincide among tires of the same kind and are formed at tread groove positions of a tire to prescribed positions on the right and left sides of the tread center.

SUMMARY OF THE INVENTION

A tire grooving apparatus of the present invention comprises:

(a) a tire support device for rotatably supporting a tire, (b) a cutter support device which rotates freely, (c) a pivotable arm which holds the cutter support device at the free end portion thereof, (d) a vertically movable block having a rotatable shaft which pivotably holds the pivotable arm and a mechanism portion for standard movement, (e) horizontally movable block holding the vertically movable block and having a mechanism portion for standard movement and a mechanism portion for correction movement which can move the block at least in the transverse direction in parallel with the tire support shaft of the tire support device, (f) a means for detecting the center deviation of the tire, (g) a means for detecting the lateral runout of the tire, and (h) a control means and is characterized in that the control means comprises a standard movement operation portion which sets the cutter at the theoretical cutting position, and a correction movement operation portion which calculates the quantity of correction movement of the cutter in accordance with input signals from the means for detecting the lateral runout of the tire and the means for detecting center deviation of tire, and operates the mechanism portion for correction movement mounted on the horizontally movable block in accordance with the calculated value.

Furthermore, a tire grooving apparatus of the present invention comprises:

(a) a tire support device for rotatably supporting a tire, (b) a cutter support device which rotates freely, (c) a pivotable arm which holds the cutter support device at the free end portion thereof, (d) a vertically movable block having a rotatable shaft which pivotably holds the pivotable arm and a mechanism portion for standard movement, (e) a horizontally movable block holding the vertically movable block and having a mechanism portion for standard movement and the mechanism portion for correction movement which can move the block at least in the transverse direction in parallel with the tire support shaft of the tire support device, (f) a means for detecting center deviation, and (g) a control means and is characterized in that the control means comprises a standard movement operation portion which sets the cutter theoretical cutting position, and a correction movement operation portion which calculates the quantity of correction movement of the cutter in accordance with an input signal from the means for detecting center deviation of the tire, and operates the mechanism portion for correction movement mounted on the horizontally movable block in accordance with the calculated value.

Moreover, a tire grooving method of the present invention is for grooving a tire according to the standard program and is characterized by, (a) a step of detecting lateral runout of the tire, (b) a step of detecting center deviation of the tire, and (c) a step of correcting the grooving position for the cutter in accordance with the detected values of lateral runout and center deviation.

Futhermore, the tire grooving method of the present invention is for grooving the tire according to the standard program and is characterized by:

(a) a step of detecting the center deviation of the tire, and (b) a step of correcting the grooving position for the cutter in accordance with the detected value of the center deviation.

Preferably, the grooving position for the cutter is corrected according to the correction program provided independently to the standard program.

Since the tire grooving apparatus of the present invention comprises a horizontally movable block having the mechanism portion for standard movement and the mechanism portion for correction movement whereby can move the cutter at least in parallel with a tire support shaft, a vertically movable block having the mechanism portion for standard movement whereby it can move the cutter in the up-down direction, a means of detecting lateral runout and center deviation of the tire or a means of detecting only center deviation, and a means of controlling the aforementioned portions, the horizontally movable block and the vertically movable block can be controlled according to the amount of standard movement, and the amount of standard movement is followed by the amount of correcting movement according to the detected values of the detecting means so that the cutter can most suitably be positioned.

Moreover, according to the tire grooving method of the present invention, the amount of standard movement of the horizontally movable block and the vertically movable block can be controlled in accordance with the standard program, and therewith the cutter can suitably be positioned by detection of the lateral runout and center deviation of the tire, or only the center deviation thereof, so that the amount of standard movement may be followed by the amount of corrected movement in accordance with the above detected values so that the cutter can most suitably be positioned.

DETAILED DESCRIPTION OF THE PREFERRED EMBODIMENTS

Figure 1:
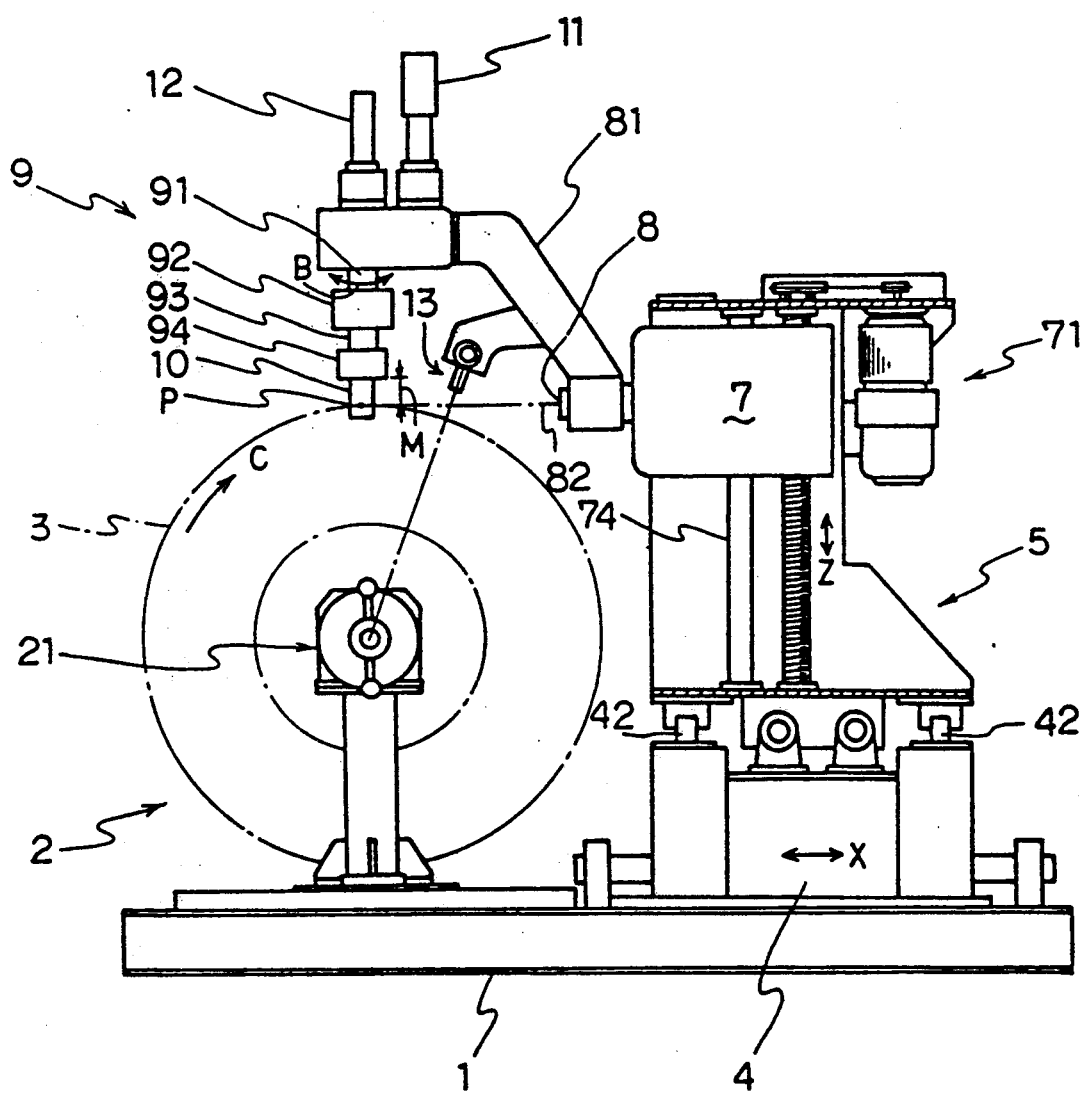
FIGS. 1 and 2 are respectively a side view and a front view of one embodiment of the tire grooving apparatus of the present invention.

The present invention is described in detail on the basis of embodiments, however the present invention is not limited to the embodiments. In the grooving apparatus shown in FIGS. 1 and 2, numeral 1 is a bed, numeral 2 in a tire support device mounted on the bed 1, on which a tire 3 is supported by a tire support shaft 21 and rotated by means of a motor 22 in the direction of an arrow C in FIG. 1. Numeral 4 is a base block which is movable along a guide bar being movably supported by rails on the bed 1 by means of a motor (not shown) in the X-axis direction perpendicular to the axis of tire support shaft 21. If the distance between the base block 4 and the tire support shaft 21 is set to a specified value, the base block 4 is not required to be moved.

Figure 21:
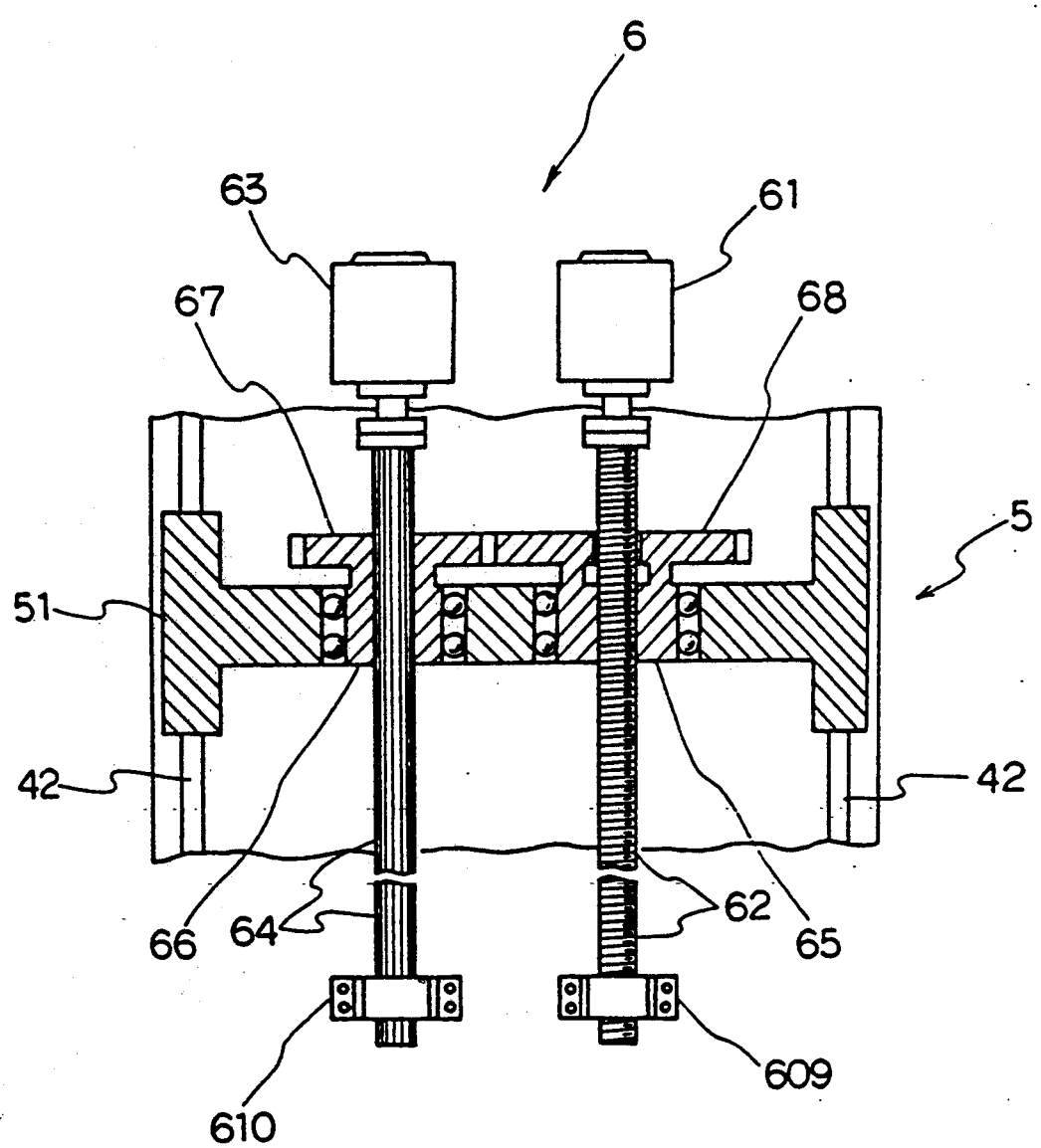
FIG. 21 is an explanatory illustration of the construction of the driving mechanism of the horizontally movable block.

Numeral 5 is a horizontally movable block which is movable along a rail 42 on the base block 4 in the Y-axis direction parallel with the tire support shaft 21. Numeral 6 is a device for driving the horizontally movable block, which comprises a mechanism portion for standard movement and a mechanism portion for correction movement as shown in FIG. 21.

Numeral 7 is a vertically movable block, which is movable along a guide shaft 74 on the horizontally movable block 5 by means of a device 71 for driving the vertically movable block in the Z-axis direction perpendicular to the bed 1.

Figure 2:
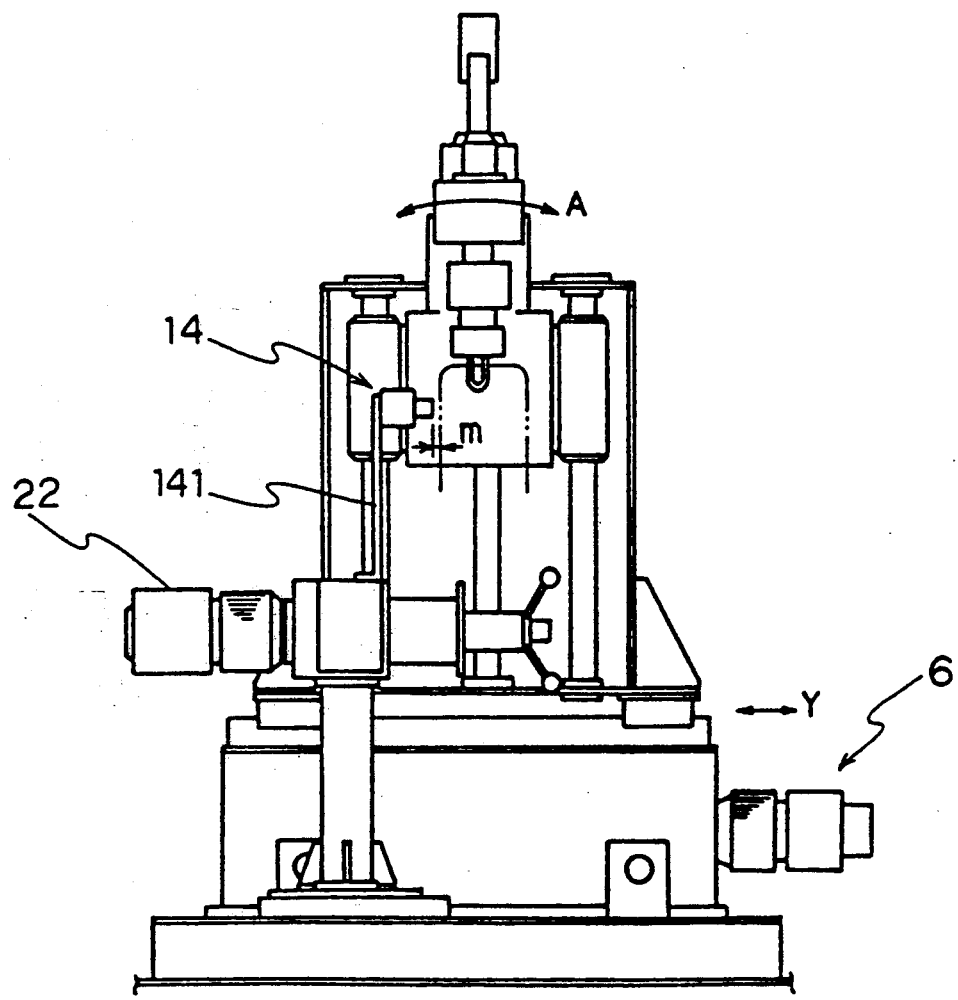

Numeral 81 is a pivotable arm, which is fixed to an arm support shaft 8 extended from the vertically movable block 7 in the X-axis direction and is rotated around the axis 82 of the arm support shaft 8 in the direction of the arrow A in FIG. 2 by means of a motor (not shown) of the vertically movable block 7.

Numeral 9 is a cutter support device attached to and projecting perpendicularly from the pivotable arm 81 toward the aforementioned axis 82, wherein a cutter support frame 92 is attached to a support rod 91 which is supported by the pivotable arm 81, a cutter holder 94 is supported by the cutter suport frame 92 with an insulator 93 being located therebetween, and a cutter 10 is removably attached to a cutter holder 94 so that the cutting position P of the cutter is on the extended axis of the aforementioned axis 82. Further, there is employed such an arrangement that the cutter 10 can be heated by a power supply (not shown). Numeral 11 is a motor by which the cutter support device 9 is rotated in the direction of the arrow B so as to allow the position of the cutter to be changed. Numeral 12 is an actuator which moves the cutter support device 9 independently in the up-down direction in order for the cutting position P of the cutter 10 to coincide with the axis 82.

Alternatively, in place of the actuator 12, cutting position P of the cutter 10 may be made coincident with the axis 82 by adjusting the position at which the cutter support device 9 is attached to the support shaft 91.

Figure 18:
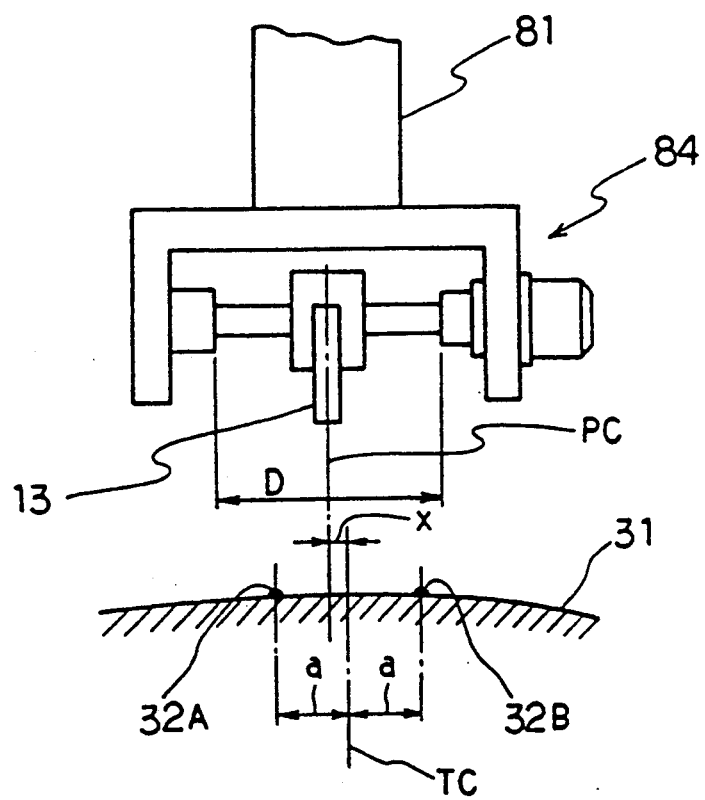
FIG. 18 is a diagram for explaining one embodiment of the method of detecting the center deviation.

Numeral 13 is a center deviation detector which comprises, for example, an optical reflection-type displacement sensor and is capable of scanning along a scan shaft 803 in the direction of the arrow D by means of a driving device 84 (see FIG. 18). If the aforementioned center deviation detector 13 is fixed in the central position on the tire tread surface to detect the radial runout of the tire and the cutting position to be cut by the cutter is corrected, it can also serve as a radial runout detector.

Numeral 14 is a lateral runout detector for detecting the lateral runout of the tire which is disposed opposite to a buttress on the side surface of the tire at a predetermined distance m. For example, the detector may be an optical reflection type displacement sensor or the like of which the position is adjustable according to a tire diameter by means of a holding device 141 provided on the tire support device 2, wherein the detected value is input to a control device (not shown) and thereby the mechanism portion for correction movement of the device for driving a horizontally movable block is driven.

Figure 3:
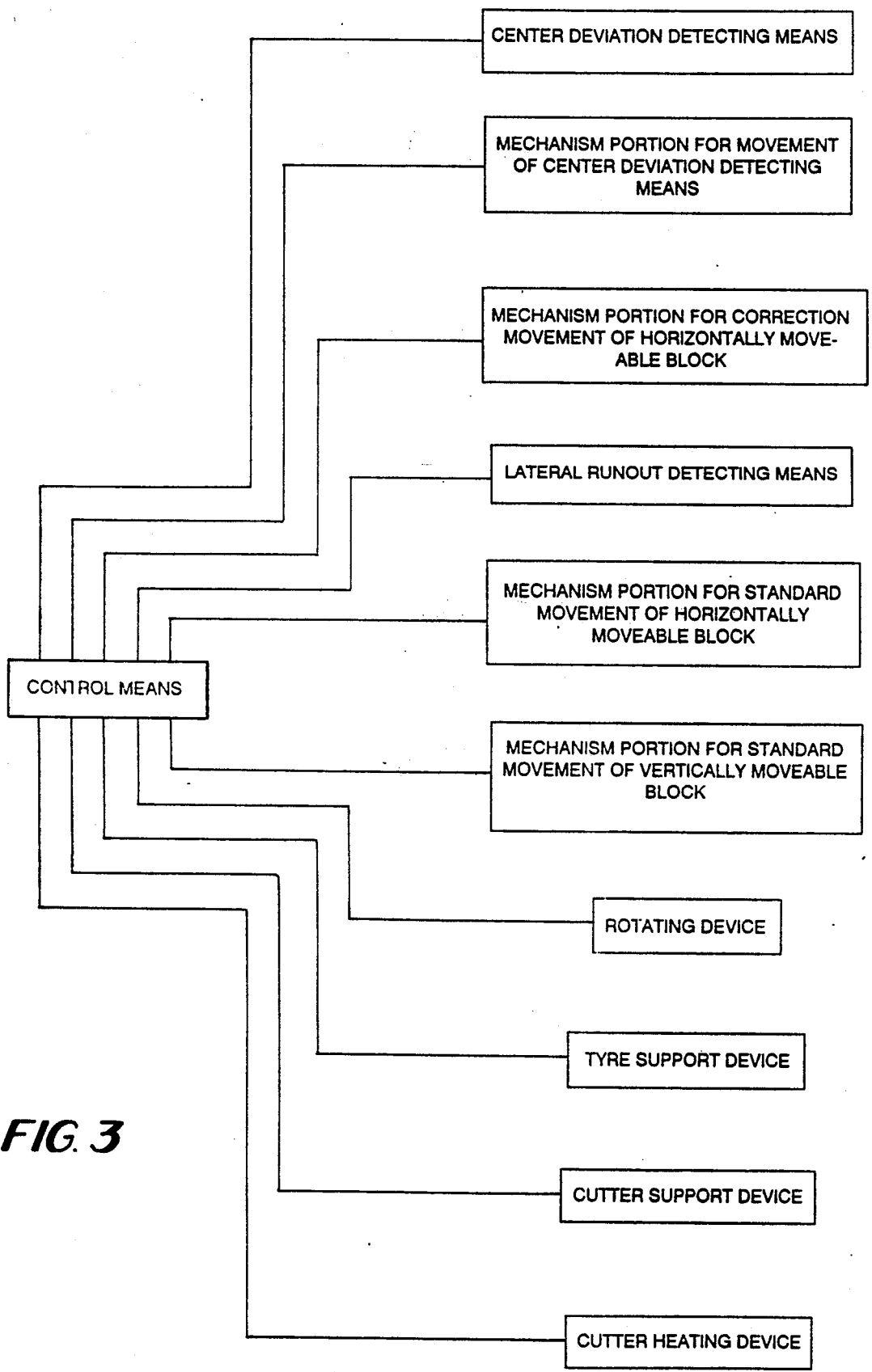
FIG. 3 is a main functional block diagram of the tire grooving apparatus shown in FIGS. 1 and 2.
Figure 4:
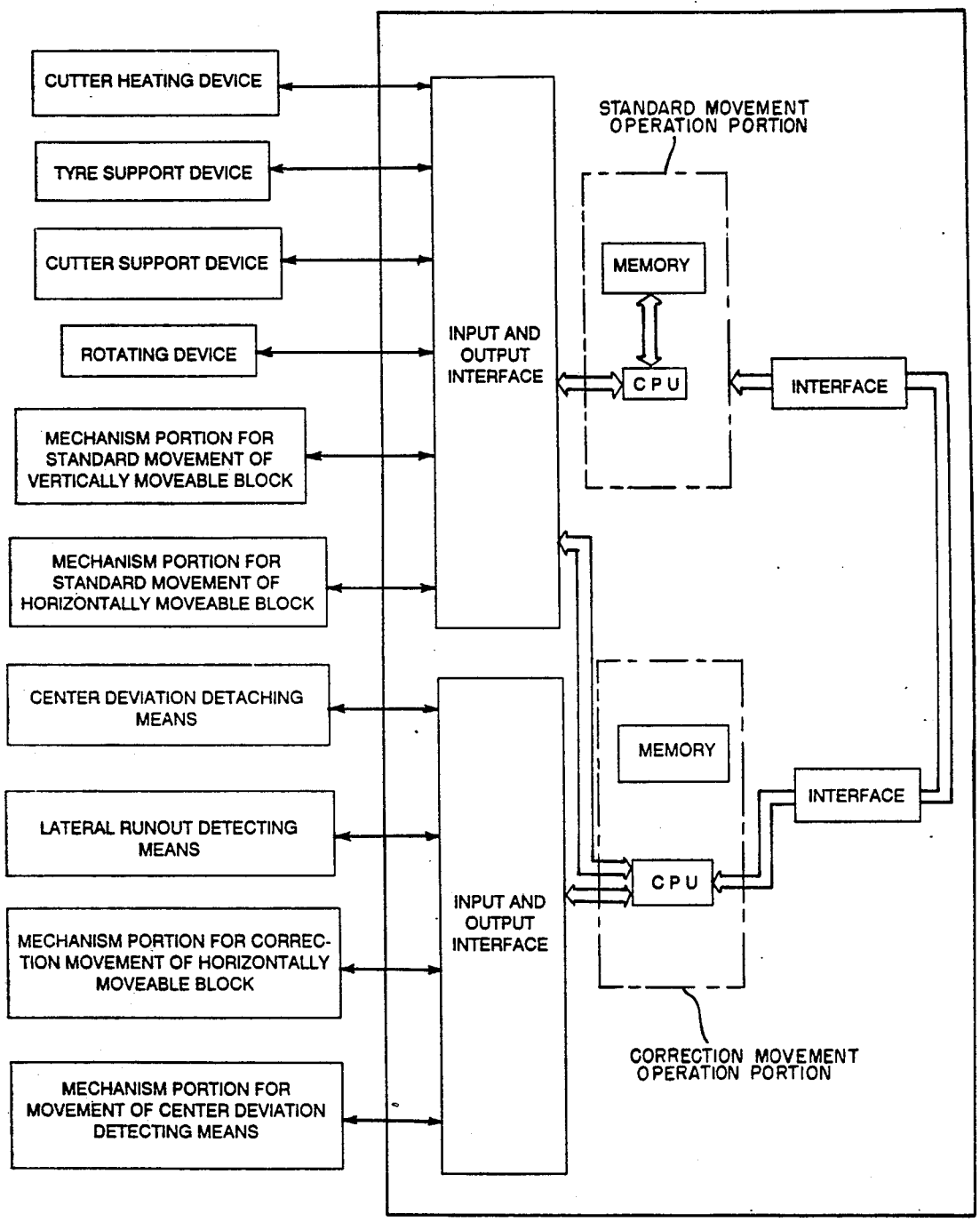
FIG. 4 is a block diagram showing an electrical construction of a main portion in the tire grooving apparatus.

Next there is explained the grooving process using the apparatus having the aforementioned construction for grooving a tire in reference to block diagrams shown in FIGS. 3 and 4 and flow charts shown in FIGS. 5 to 17.

As shown in FIGS. 3 and 4, the tire grooving apparatus of the present invention comprises a center deviation detecting means, a cutter heating device, a cutter support device, a tire support device, a rotating device, a mechanism portion for standard movement of the vertically movable block, a mechanism portion for standard movement of the horizontally movable block, a lateral runout detecting means, a mechanism portion for correction movement of the horizontally movable block, a mechanism portion for movement of the center deviation detecting means and a control means. The aformentioned control means includes a standard movement operating portion and correction movement operating portion as shown in FIG. 4. The aforementioned standard movement operating portion and the correction movement operating portion each contains a central processing unit (CPU) and a memory. The standard movement operating portion is connected through an input-output interface to the cutter heating device, the tire support device 2, the cutter support device 9, the rotating device, the mechanism portion for standard movement of the vertically movable block and the mechanism portion for standard movement of the horizontally movable block. The correction movement operating portion is connected through the input-output interface to the center deviation detecting means, the lateral runout detecting means, the mechanism portion for correction movement of the horizontally movable block and the mechanism portion for movement of the center deviation detecting means. Furthermore, the standard movement operating portion and the correction movement operating portion are connected through the interface to each other.

The programs required for grooving operation such as a program for controlling the operation of the cutter 10 for a tire having no runout, a program for controlling the rotation of a tire and a program for controlling the correction movement operating portion are stored in the memory in the aforementioned standard movement operating portion. The program required for the correcting operation such as a program for controlling the center deviation detecting means, a program for controlling the lateral runout detecting means, a program for controlling the mechanism portion for correction movement of the horizontally movable block and a program for controlling the mechanism portion for movement of the center deviation detecting means are stored in the memory in the aforementioned correction movement operating portion.

There is explained a method of grooving by means of the apparatus for grooving a tire having the aforementioned construction in reference to FIGS. 5 to 17.

Figure 5:
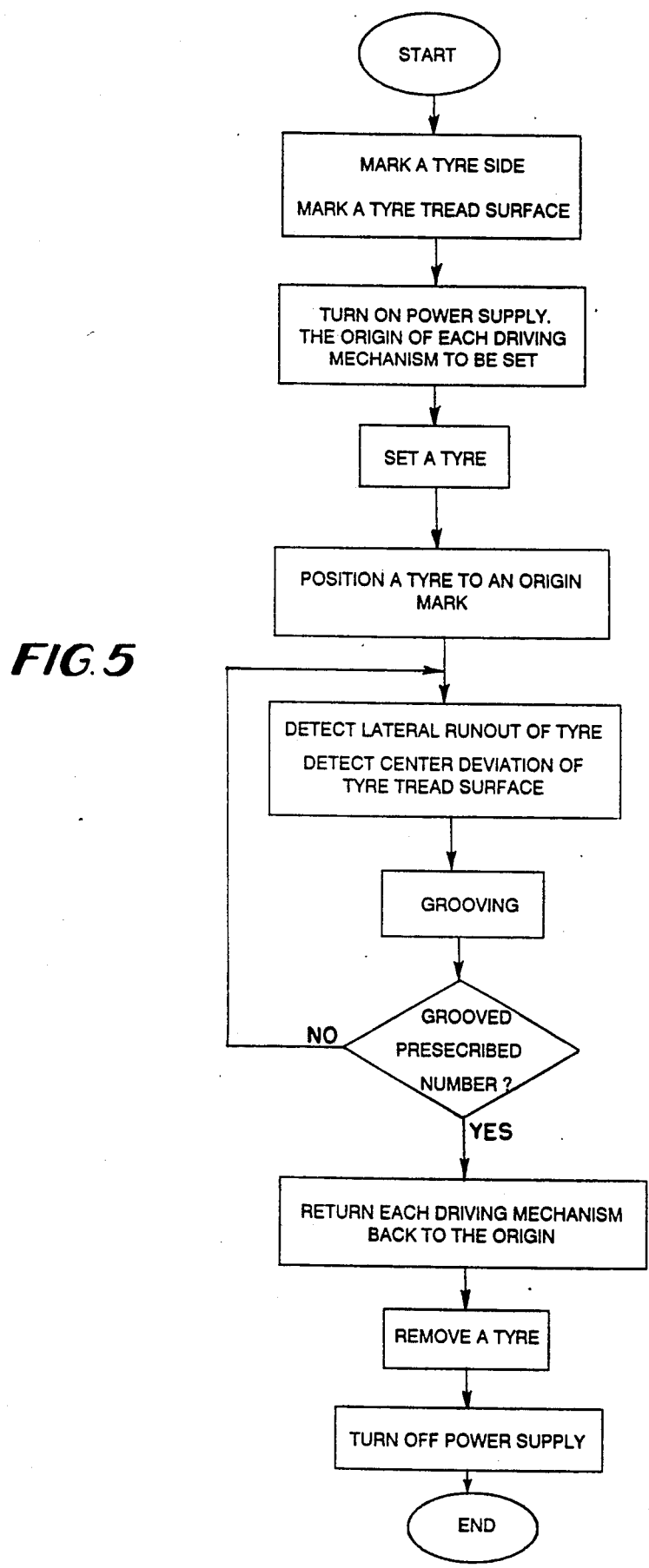
FIG. 5 is a flow chart for carrying out the grooving on the basis of the data of premeasured lateral and center deviations.

FIG. 5 is a flow chart for the case of grooving on the basis of the data of the lateral runout and center deviation measured in advance.

1) An origin mark is put on the side of the tire and a detection mark is put on the tire tread surface. Preferably, the aforementioned origin mark is put at a position coincident with any required wear indicator. Alternatively, the wear indicator itself may be used as the origin mark in place of the aforementioned marking. By way of example, the detection mark has a shape of a small projection which is 1 mm in width, 1 mm in height and 1 mm in length and is formed by means of a concavity provided in a metal mold when the tire is cured. So long as the aforementioned detection mark is large enough to be detected by the center deviation detector 13, there is no particular limitation on its size. However, if it is too small, it is difficult to be detected. The minimum dimension which can be detected is, for example, 0.5 mm in width, 0.5 mm in height and 0.5 mm in length. The position in which the detection mark is put and the number thereof are properly selected according to the grooving method.

2) The power supply is turned ON, and the origin of each driving mechanism (device) is set.

3) The tire 3 whose marked pattern tread should be grooved is fitted on the tire support shaft 21 in accordance with the aforementioned process, the lateral runout detector 14 is provided facing the side of the tire buttress, and the center deviation detector 13 is provided facing the tire tread surface.

4) A tire is positioned according to the origin mark of the tire. Namely, the aforementioned origin mark provided on the side of the tire is brought to be coincident with the position of the lateral runout detector 14.

Figure 6:
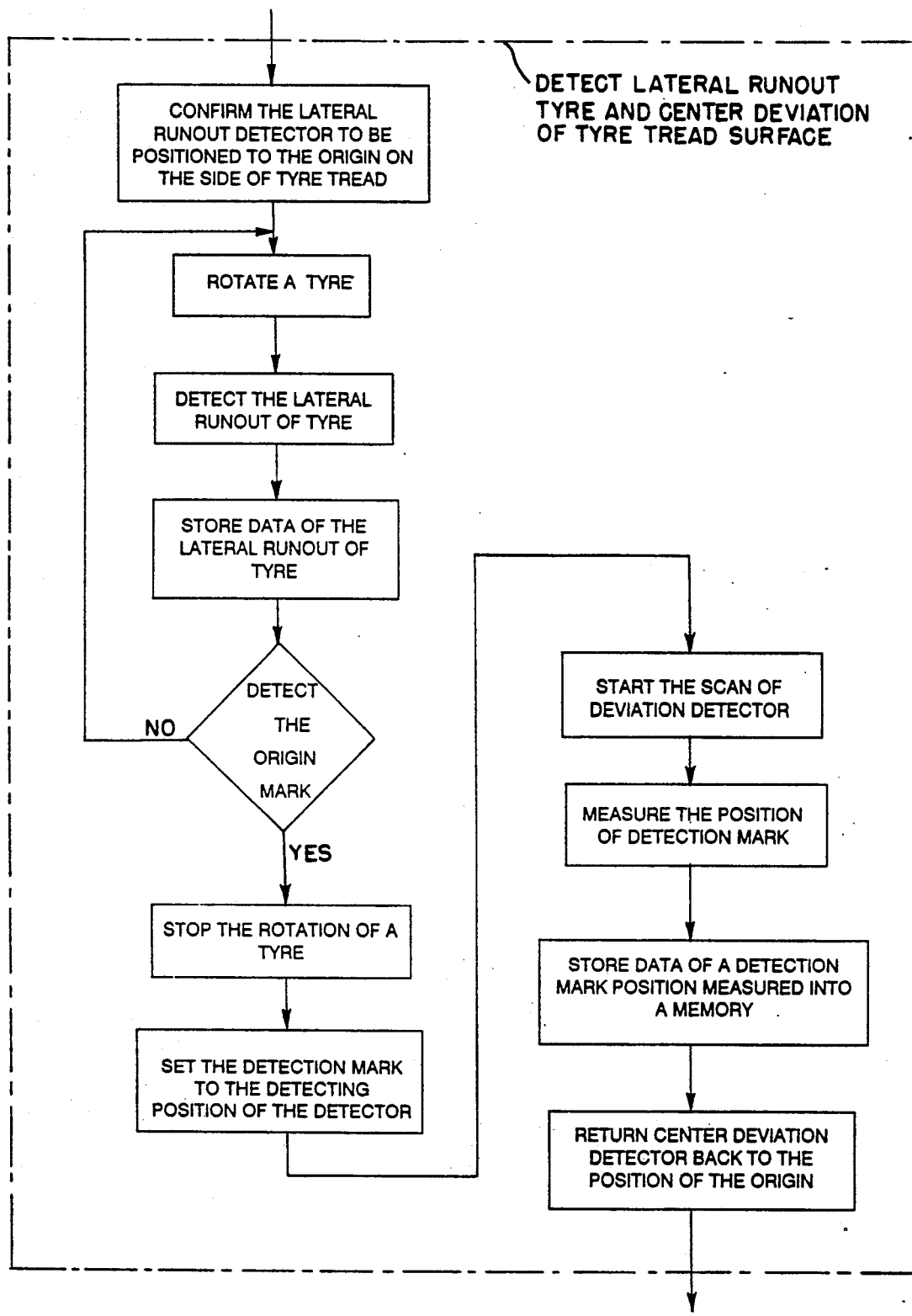
FIGS. 6 and 7 are respectively detailed flow charts of one embodiment relative to portions for detecting the lateral runout of the tire and for detecting the center deviation on the tire tread surface, and a grooving portion in FIG. 5, in which the center deviation is detected in only one point.
Figure 8:
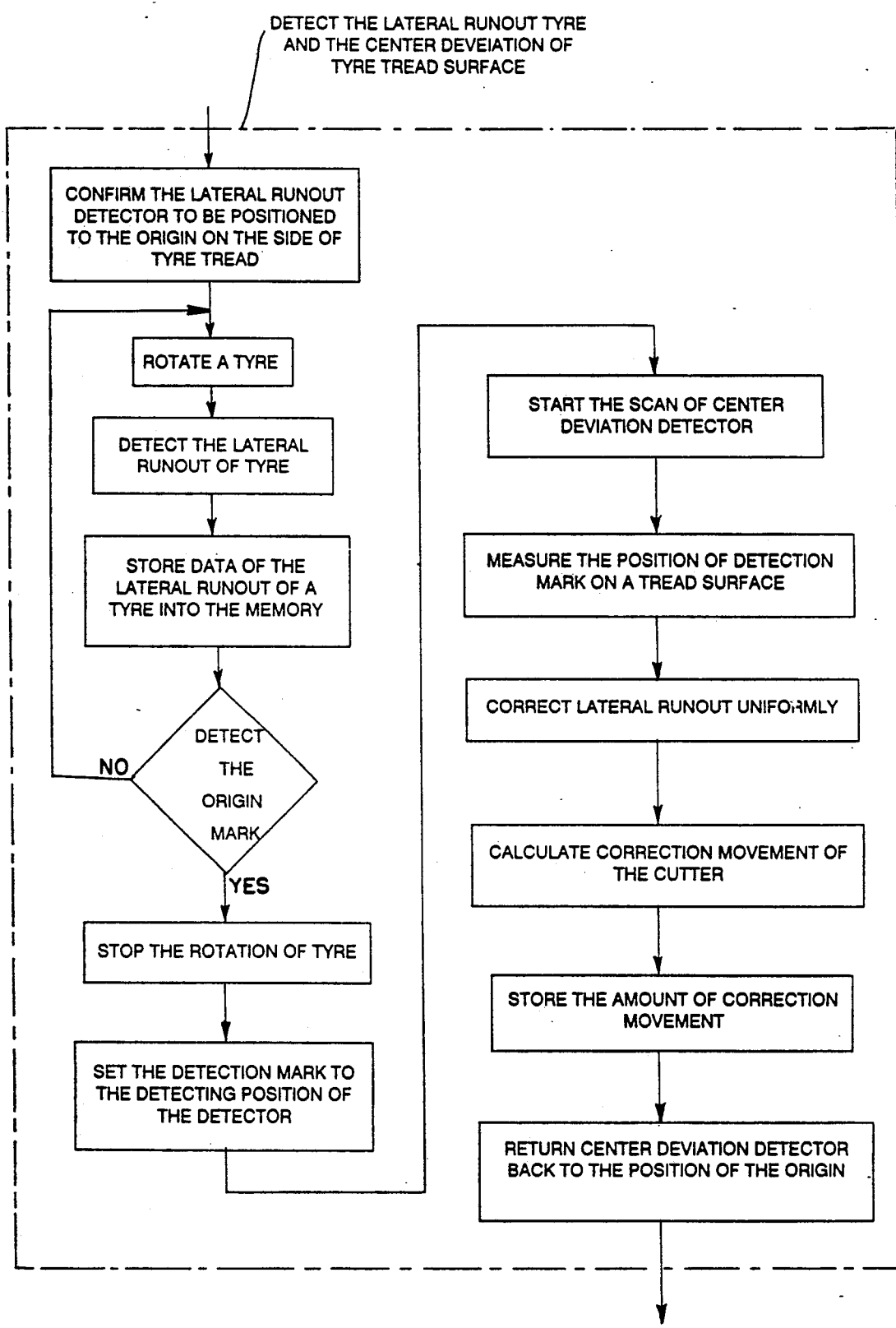
FIGS. 8 and 9 are respectively detailed flow charts of another embodiment relative to portions for detecting the lateral runout of the tire and for detecting the center deviation on the tread surface, and the grooving portion in FIG. 5, in which the center deviation is detected in only one point.
Figure 10:
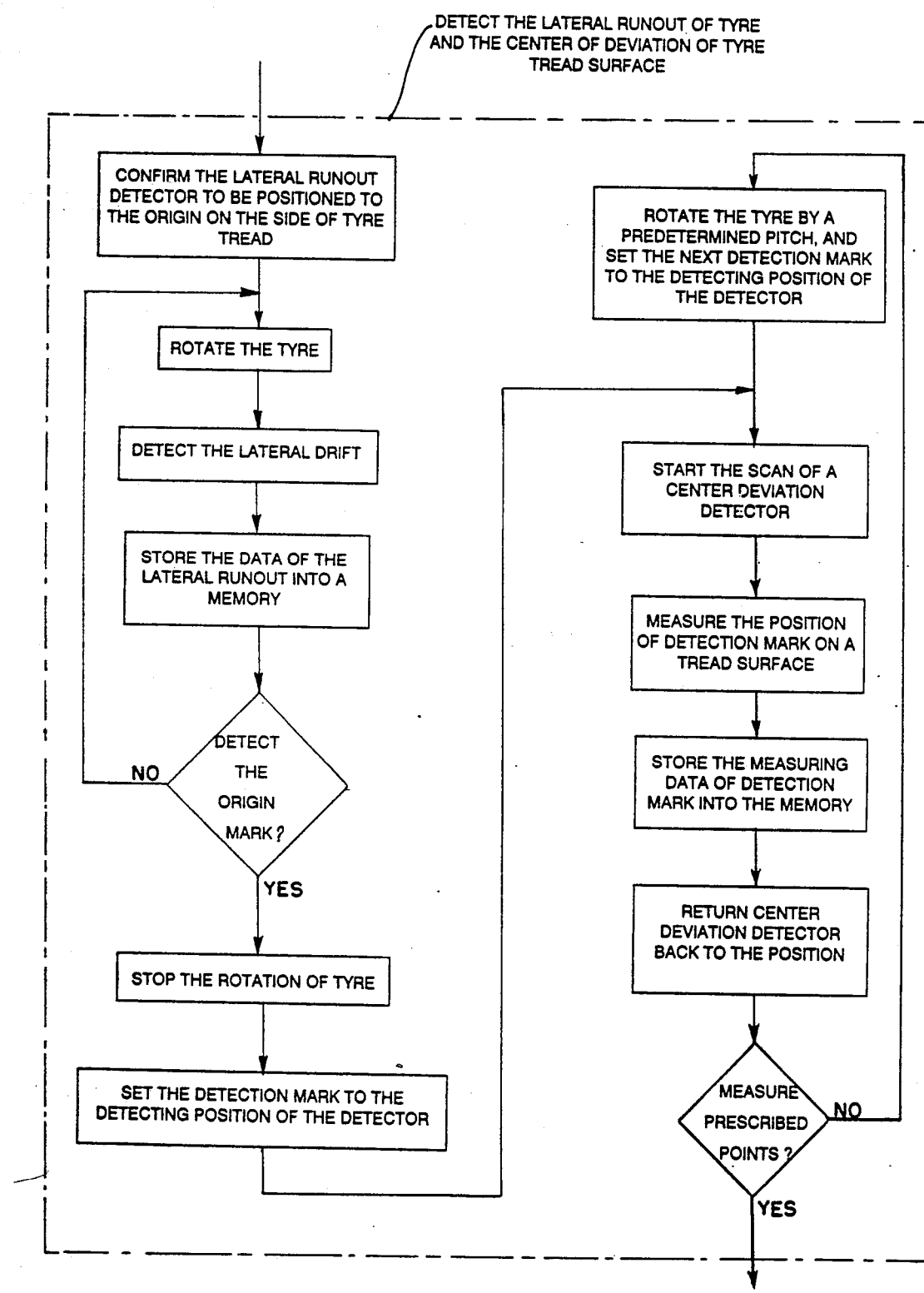
FIGS. 10 and 11 are detailed flow charts of one embodiment relative to portions for detecting the lateral runout of the tire and for detecting the center deviation on the tread surface and the grooving portion in FIG. 5, in which the center deviation is detected in a plurality of points.

5) The lateral runout of the tire and the center deviation of the tire tread surface are detected. The examples of the detailed flow charts for this portion are shown in FIGS. 6, 8 and 10.

Figure 7:
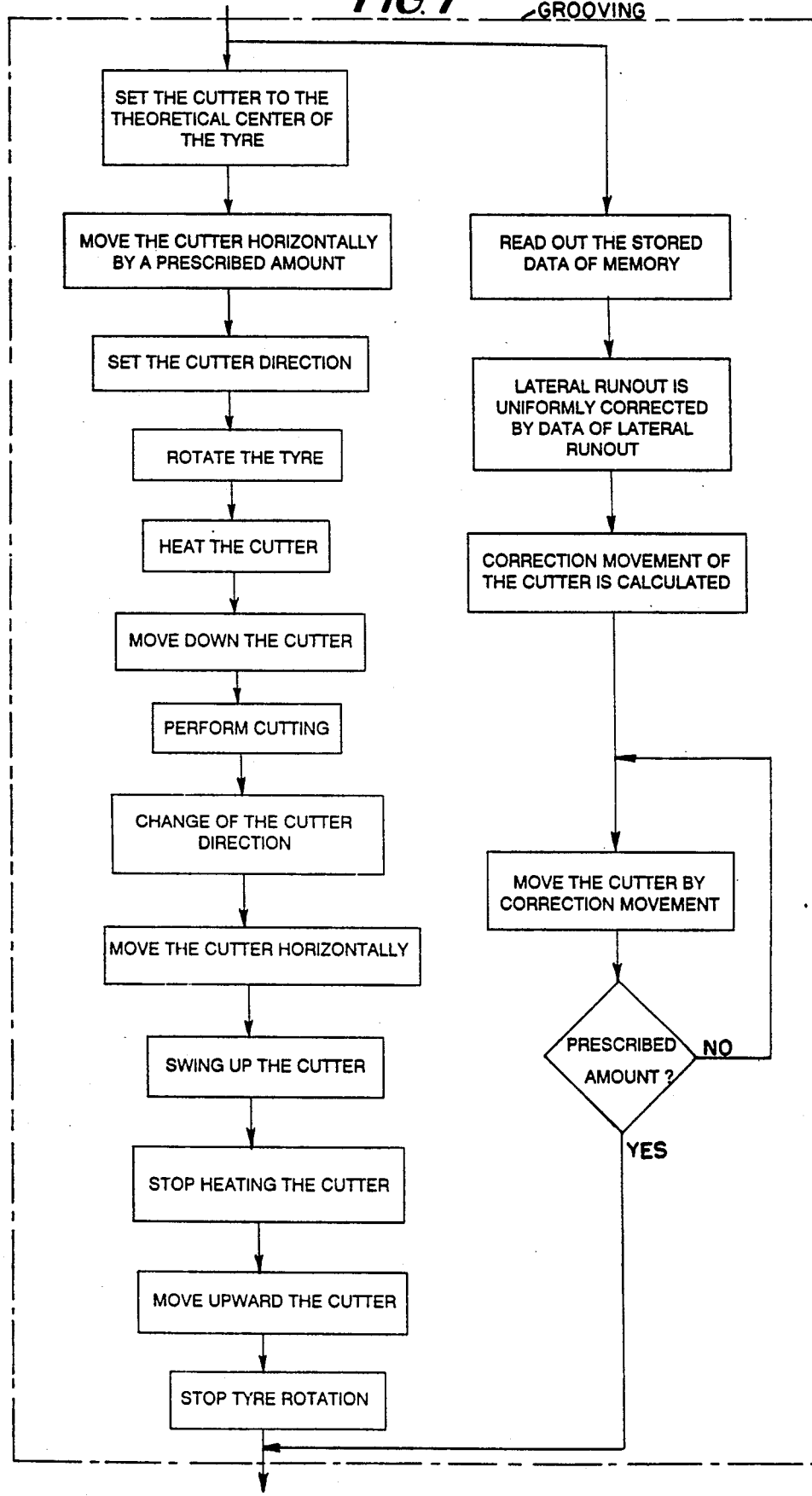
Figure 9:
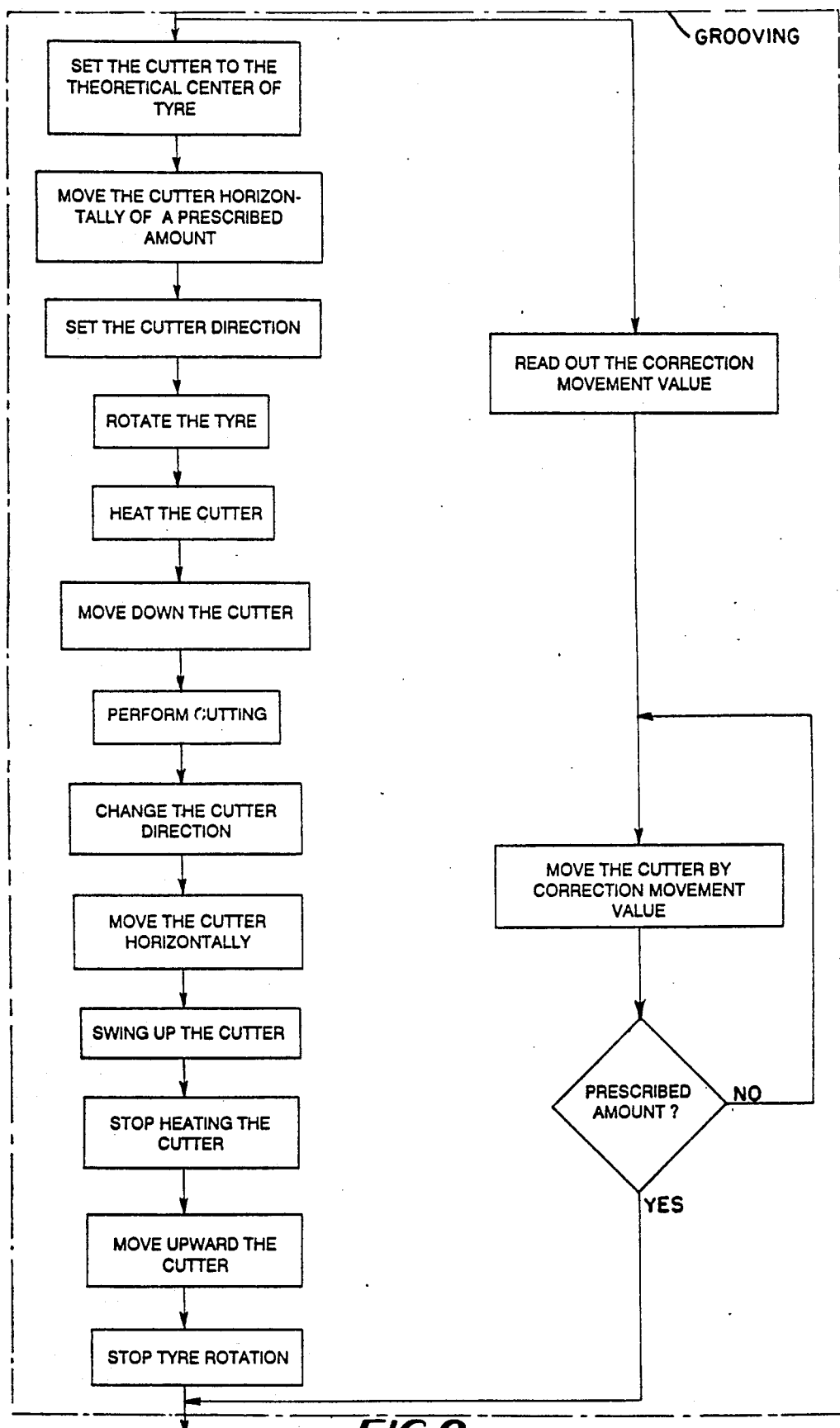
Figure 11:
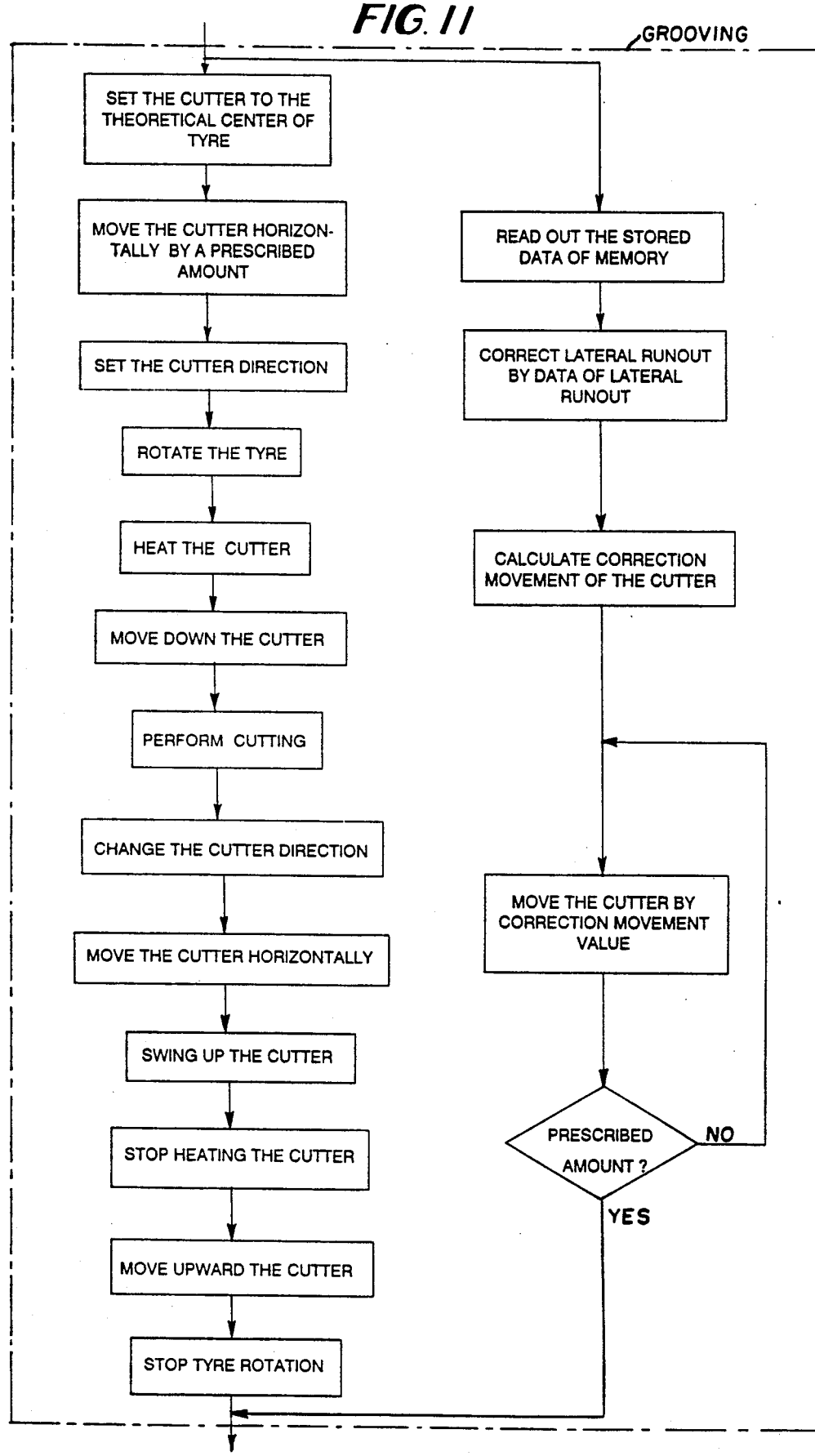

6) The grooving is carried out while correcting the amount of movement of the cutter on the basis of the data of the aforementioned lateral runout and the center deviation. The examples of the detailed flow chart in relation to this portion are shown in FIGS. 7, 9 and 11.

7) It is determined whether or not a prescribed number of grooves has been grooved. If it is confirmed that the prescribed number of grooves has been grooved, the next step is followed and if not, the procedure returns to the steps of detecting lateral runout of the tire and the center deviation of the tire tread surface.

8) If the prescribed number of grooves has been grooved, each driving mechanism (device) is returned to the origin.

9) The grooved tire 3 is removed from the tire support shaft 21.

10) The power supply is turned OFF and the grooving is complete.

FIGS. 6 and 7 are the detailed flow charts respectively for the portions where the lateral runout of the tire and the center deviation of the tire tread surface are detected and for the portion of the grooving operation in FIG. 5, and the flow charts are for one embodiment wherein the center deviation is detected at only one place.

(S1) Whether or not the origin mark on the side of the tire tread is positioned to face the lateral runout detector 14 is confirmed.

(S2) The motor 22 fitted on the tire support shaft 21 is driven under the control of the controlling means, and the tire 3 is rotated at the low speed in the direction of the arrow C in FIG. 1.

(S3) The lateral runout of the tire is detected by the lateral runout detector 14.

(S4) The data of the lateral runout detected in step S3 is stored in the memory in the correction movement operating portion.

(S5) The detection of the lateral runout of the tire is carried on until the origin mark on the side of the tire is detected.

(S6) When the origin mark is detected, the rotation of the tire is stopped.

(S7) The detection mark on the tread surface is set to the detecting position of the center deviation detector.

(S8) The mechanism portion for moving a center deviation detector is driven under the control of the controlling means and the center deviation detector scans.

(S9) The detection mark on the tire tread surface is detected by the detector 13.

(S10) The position of the detection mark measured by the center deviation detector 13 is stored in the memory in the correction movement operating portion.

(S11) When the scan is terminated, the center deviation detector 13 is returned to the position of the origin under the control of the controlling means.

FIG. 18 is a diagram for explaining the aforementioned steps (S1) to (S11). In FIG. 18, numeral 31 is a tire tread surface, numerals 32A and 32B are detection marks provided on the tire tread surface, numeral 84 is a mechanism portion for movement of the center deviation detecting means (a moving device), PC is a theoretical tread center, TC is an actual tire tread center and X is an amount of the center deviation. In FIG. 18, the center deviation detector 13 scans in the direction of the arrow D.

After the data of the lateral runout and the center deviation are obtained according to the aforementioned steps, the grooving is performed. The detailed flow charts concerning the standard movement in the grooving process are identical with one another. Therefore the aforementioned portion of FIG. 7 is explained here and those of other drawings (FIGS. 9, 11, and 17) are omitted from the explanation of those drawings.

(G1) According to the standard program in the standard movement operating portion, the following process is carried out.
  (i) The mechanism portion for standard movement of the horizontally movable block is driven and thereby the cutter 10 is set at the theoretical center of the tire.
  (ii) The mechanism portion for standard movement of the horizontally movable block is driven again and thereby the cutter 10 is moved to the theoretical position for grooving.
  (iii) The motor 11 of the cutter support device 9 is driven and thereby the direction of the cutter is set.
  (iv) The motor 22 of the tire support device 2 is driven and thereby the tire 3 is rotated at the low speed in the direction of the arrow C in FIG. 1.

(v) The cutter heating device is turned on and thereby the cutter 10 is heated.

(vi) The mechanism portion for standard movement of the vertically movable block and if necessary the actuator 12 of the cutter support device 9 are driven, the cutter 10 is moved down by a predetermined amount, and thereby the cutting is performed by a predetermined depth.

(vii) The directional change, the lateral movement and the like of the cutter 10 are performed according to the predetermined grooving patern, and the cutting is swung up for finish when the predetermined grooving is completed.

(viii) The heating of the cutter 10 is stopped.

(ix) The cutter 10 is moved upward and is kept apart from the tread surface.

(x) The rotation of the tire is stopped.

(G2) According the correction movement operating portion controlled by the command of the standard movement operating portion, the following process is carried out along with the aforementioned standard processing operation.

(i) The data of the lateral runout and the center deviation are read out from the memory of the correction movement operating portion.

Figure 19:
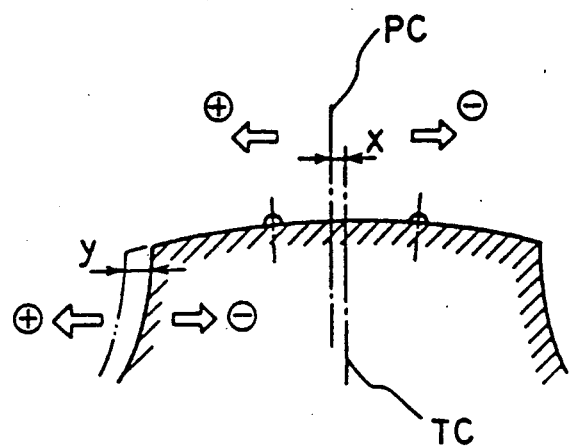
FIG. 19 is an explanatory illustration of lateral runout of tire and center deviation of the tread.
Figure 20:
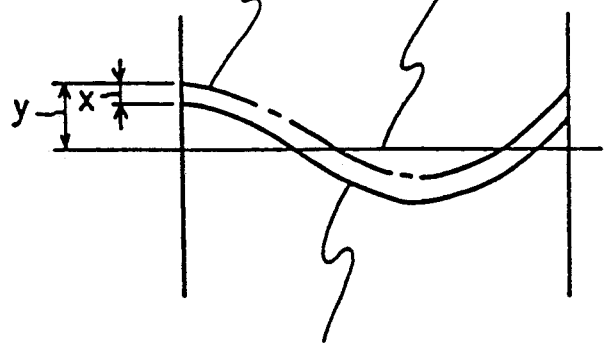
FIG. 20 is a graph for showing the amount of correction movement of a cutter.

(ii) In the CPU of the correction movement operating portion, the data of the lateral runout is corrected based on the data of the center deviation and the amount of the correction movement of the cutter is calculated. In the example shown in FIG. 7, the detection of the center deviation is performed at only one point, and therefore that data of the lateral runout is corrected evenly by the data of the center deviation. FIG. 19 is a diagram for explaining the relationship between the amount of the lateral runout y and that of the center deviation x and FIG. 20 is a graph showing the amount of the correction movement of the cutter. The formula (I) shown in FIG. 20 is as follows:

$$LRO_1 = LRO_0 + x - y \quad (I)$$

(wherein, $LRO_0$: the amount of the cutter movement corrected by the data of the lateral runout $LRO_1$: the amount of the cutter movement corrected by the data of the lateral runout and that of the center deviation x: the amount of the center deviation y: the amount of the lateral runout)

The formula (I) applied to the example shown in FIG. 19 is as follows:

$$LRO_1 = LRO_0 + (-|x|) - (+|y|)$$

(iii) The correction movement of the cutter is conducted according to the amount of the correction movement calculated by the above formula.

(iv) If the correction movement is performed by a predetermined amount in accordance with said correction movement, the correcting operation is terminated. If the predetermined amount is not reached, the correction movement is carried out until it is reached.

The example shown in FIGS. 8 and 9 is similar to the example shown in FIGS. 6 and 7, differing only in that while the amount of the correction movement of the cutter is calculated at the time of the grooving in the example of FIGS. 6 and 7, it is calculated when detecting the lateral runout of the tire and the center deviation of the tread surface is performed in the example of FIGS. 8 and 9. For that reason, the detailed description of the flow chart is omitted.

The examples in FIGS. 10 and 11 are similar to ones in FIGS. 6 and 7, but they are different in the following respect. Namely, while the center deviation is detected in only one place in FIGS. 6 and 7, it is detected in a plurality of places in FIGS. 10 and 11. Preferably, the center deviation is detected in 2 to 360 places in consideration of the workability and the economy.

In the following, the different points in the flow charts shown in FIGS. 10 and 11 will be described.

(S21) When the first center deviation measurement is carried out, the tire is rotated by a predetermined pitch and the second center deviation measurement is carried out.

(S22) The measurement of the center deviation is repeated as many times as the number of places having detection marks. After the completion thereof, the step of grooving is started.

(G3) In the step of grooving, the amount of the movement of the cutter is corrected in the following manner.

(i) The data of the lateral runout and that of the center deviation are read out from the memory, and thereby the data of the center deviation is corrected by that of the lateral runout. The amount of the center deviation x used in the above correction is calculated according to the following formula (II):

$$x = \frac{\theta - \theta_n}{\theta_{n+1} - \theta_n} \times (X_{n+1} - X_n) + X_n \quad (II)$$

(wherein, $X_n$, $X_{n+1}$: the measured values of center deviations at n and n+1

$\theta_n$, $\theta_{n+1}$: rotational angles at n and n+1

$\theta$: the rotational angle at the required position

X: the amount of the center deviation at the position whose rotational angle is $\theta$.)

(ii) The amount of the correction movement of the cutter is calculated based on the aforementioned amount of the center deviation X according to the formula (I).

(iii) The correction movement of the cutter is performed on the basis of the aforementioned amount of the correction movement.

Figure 12:
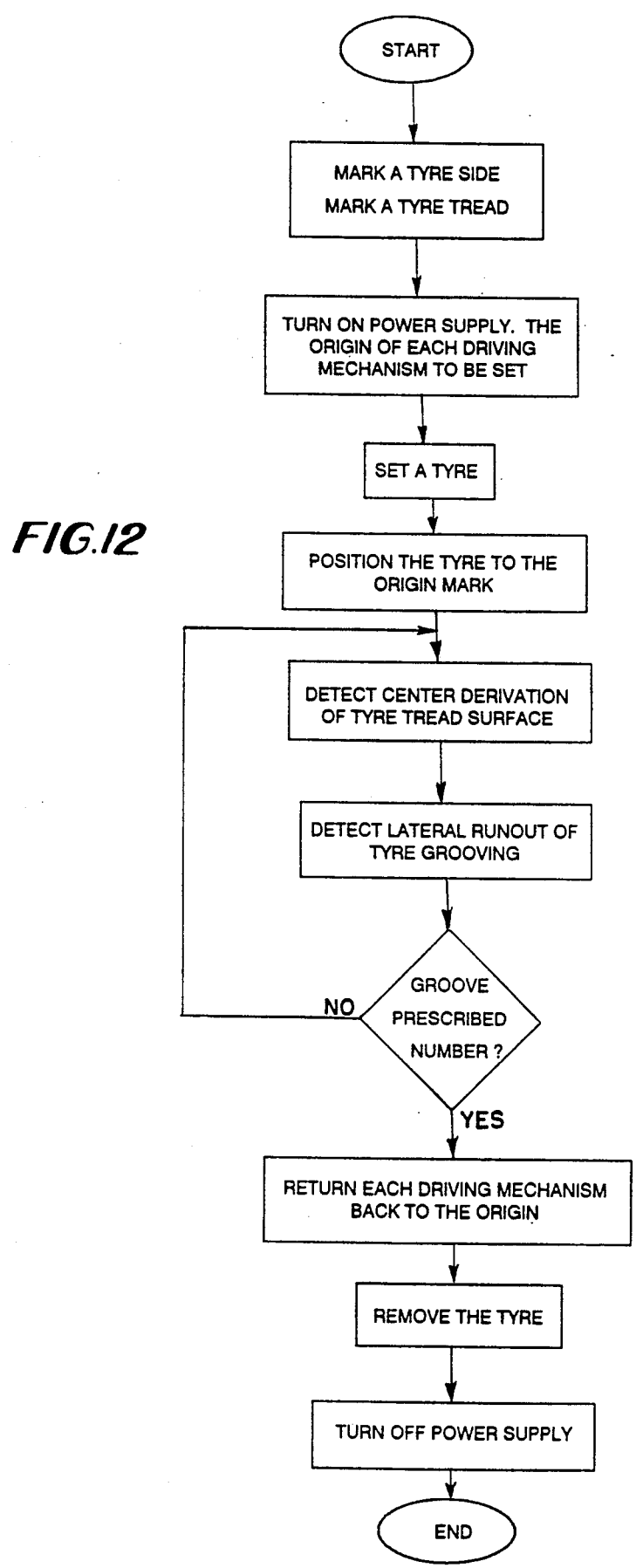
FIG. 12 is a flow chart in which the grooving is performed while detecting the lateral runout of the tire.
Figure 13:
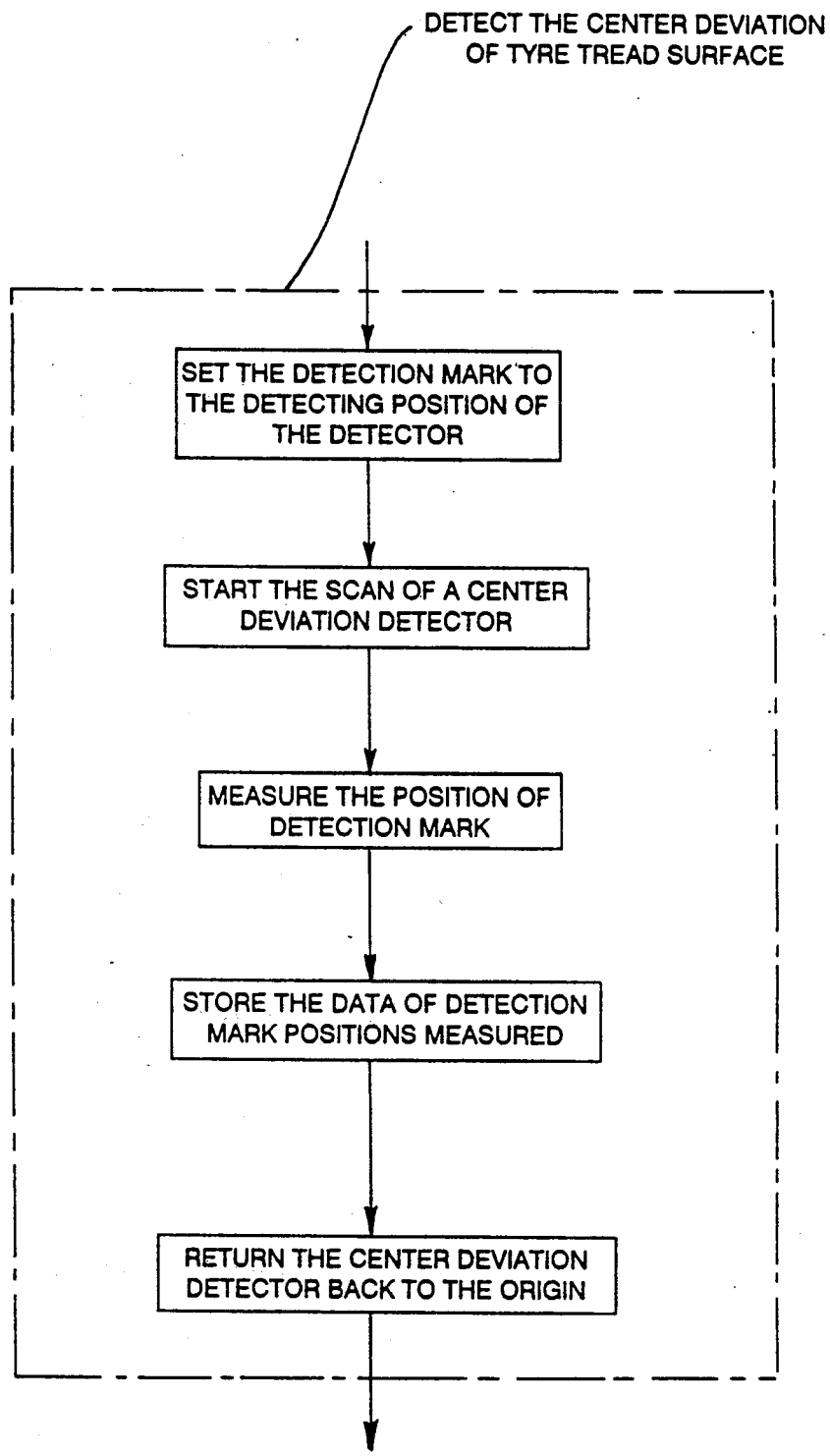
FIGS. 13 and 14 are respectively detailed flow charts relative to portions for detecting the lateral runout and center deviation on the tire tread surface, and a grooving portion in FIG. 12.

FIG. 12 is a flow chart showing the case of grooving while detecting the lateral runout of the tire. It is similar to FIG. 5 except that the step of detecting the lateral runout of a tire is moved to the step of grooving. FIG. 13 is a detailed flow chart of a portion for detecting the center deviation of the tire tread in FIG. 12. The flow chart of FIG. 13 is similar to that of FIG. 6 excepting that FIG. 13 does not include the flow of the part for detecting the lateral runout, and therefore the detailed description will be omitted.

Figure 14:
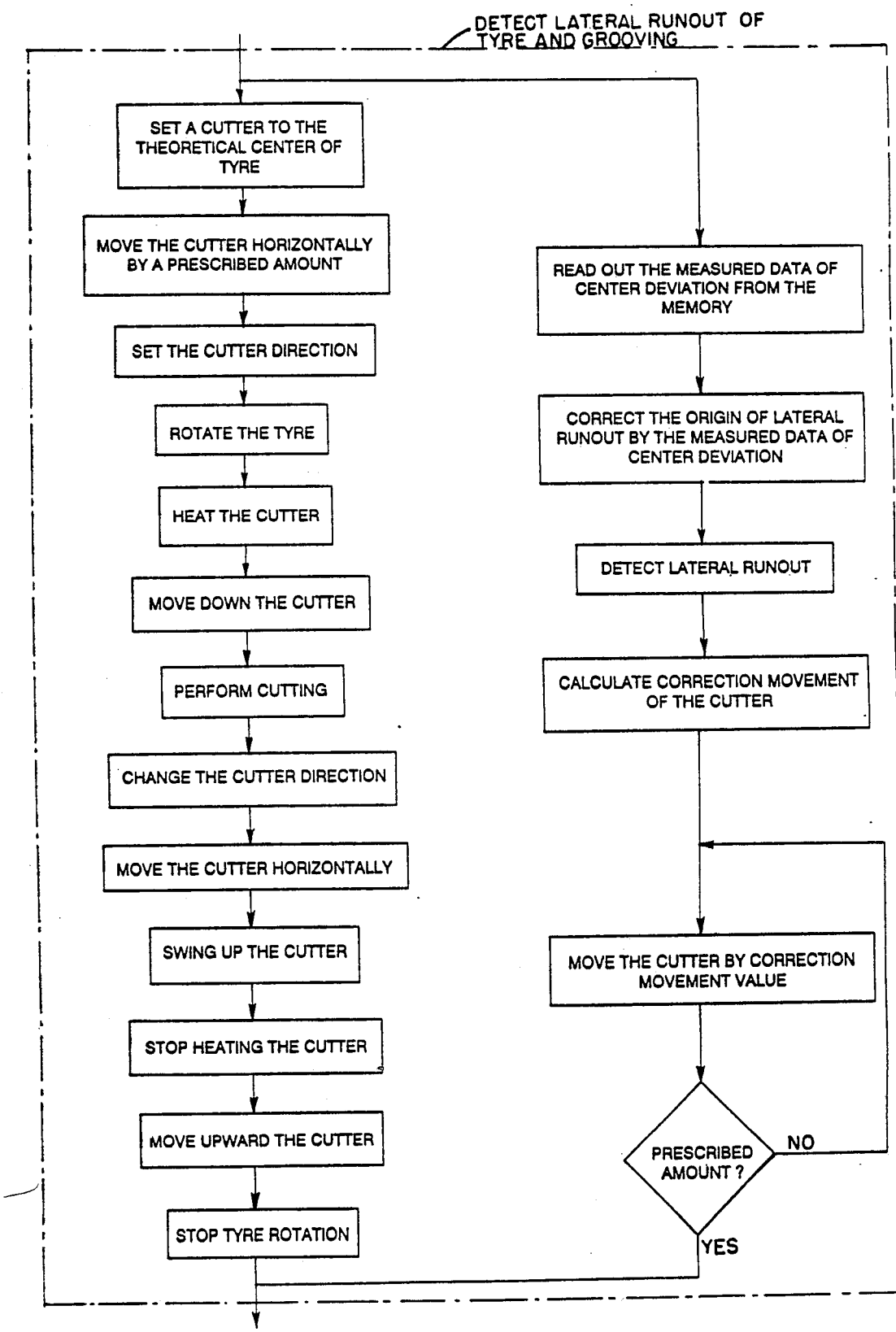

FIG. 14 is a flow chart of the steps for detecting the lateral runout and for grooving in FIG. 12. The flow chart of FIG. 14 is similar to that of FIG. 7 except that the position of the origin of the lateral runout is corrected in advance according to the data of the center deviation stored in the memory in the correction movement operating portion and thereby the lateral runout is detected, and the amount of the correction movement of the cutter 10 is calculated on the basis of the measured value of the above lateral runout. Therefore, the detailed description thereof will be omitted.

Figure 15:
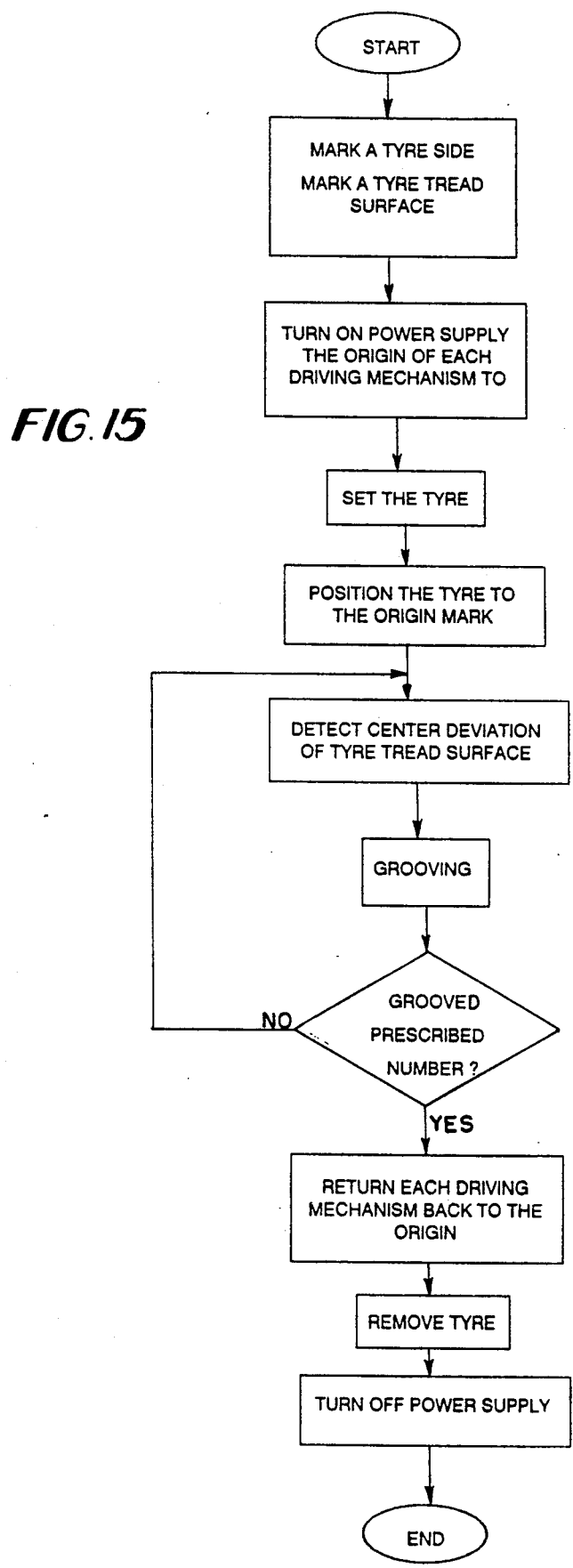
FIG. 15 is a flow chart in which the grooving is performed on the basis of the data of the center deviation only.

FIG. 15 is a flow chart showing the case of carrying out the correction movement of the cutter only by the measurement of the center deviation of the tire without the detection of the lateral runout thereof. FIG. 15 is similar to FIG. 5 except that the step for detecting the lateral runout of the tire is omitted, and therefore the detailed description will be omitted.

Figure 16:
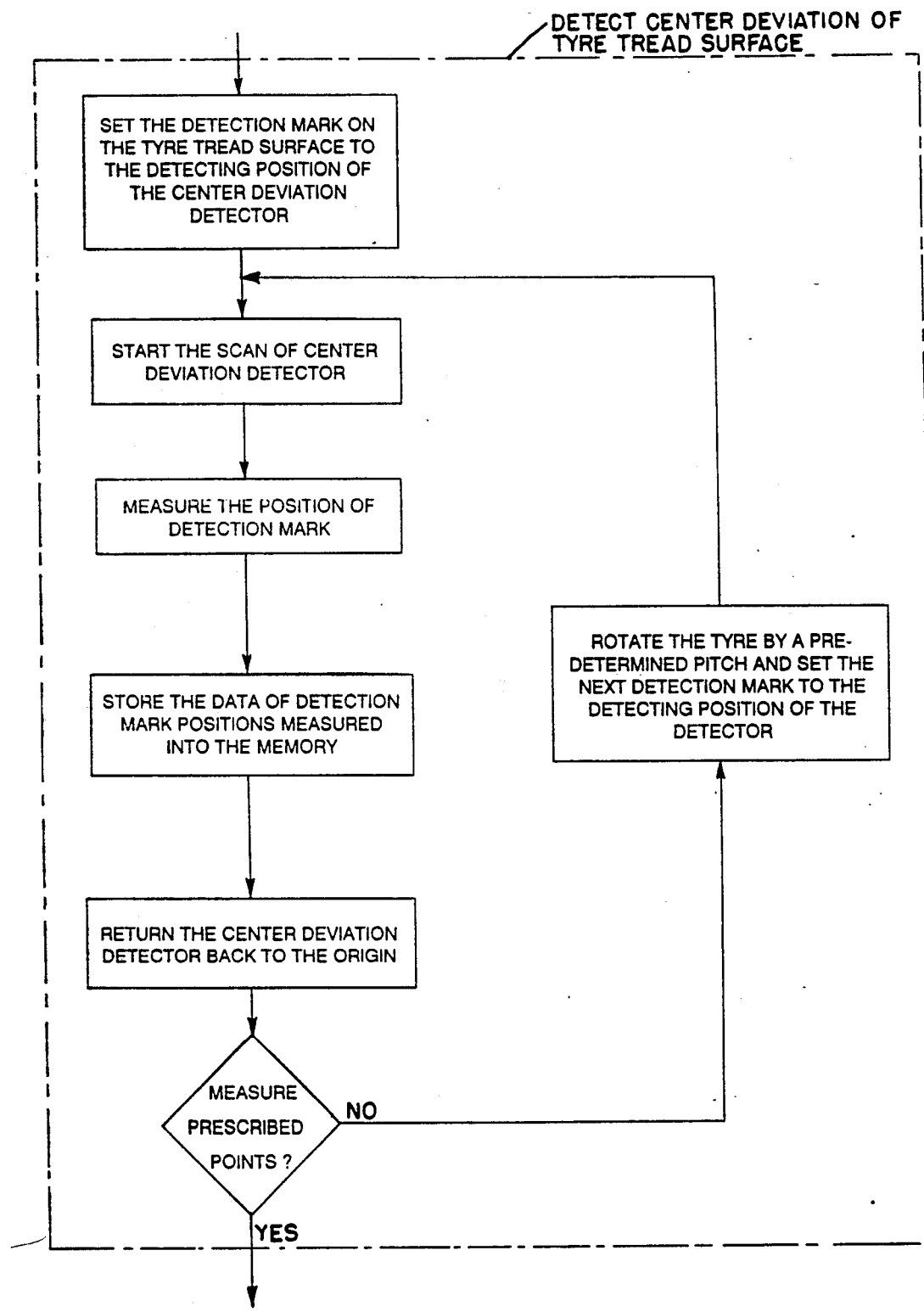
FIGS. 16 and 17 and respectively detailed flow charts relative to a portion for detecting the center deviation on the tire tread surface and the grooving portion in FIG. 15.

FIG. 16 is a detailed flow chart of the step for detecting the center deviation on the tread surface. FIG. 16 is similar to FIG. 10 except that the flow of the part for detecting the lateral runout is omitted, and therefore the detailed description will be omitted.

Figure 17:
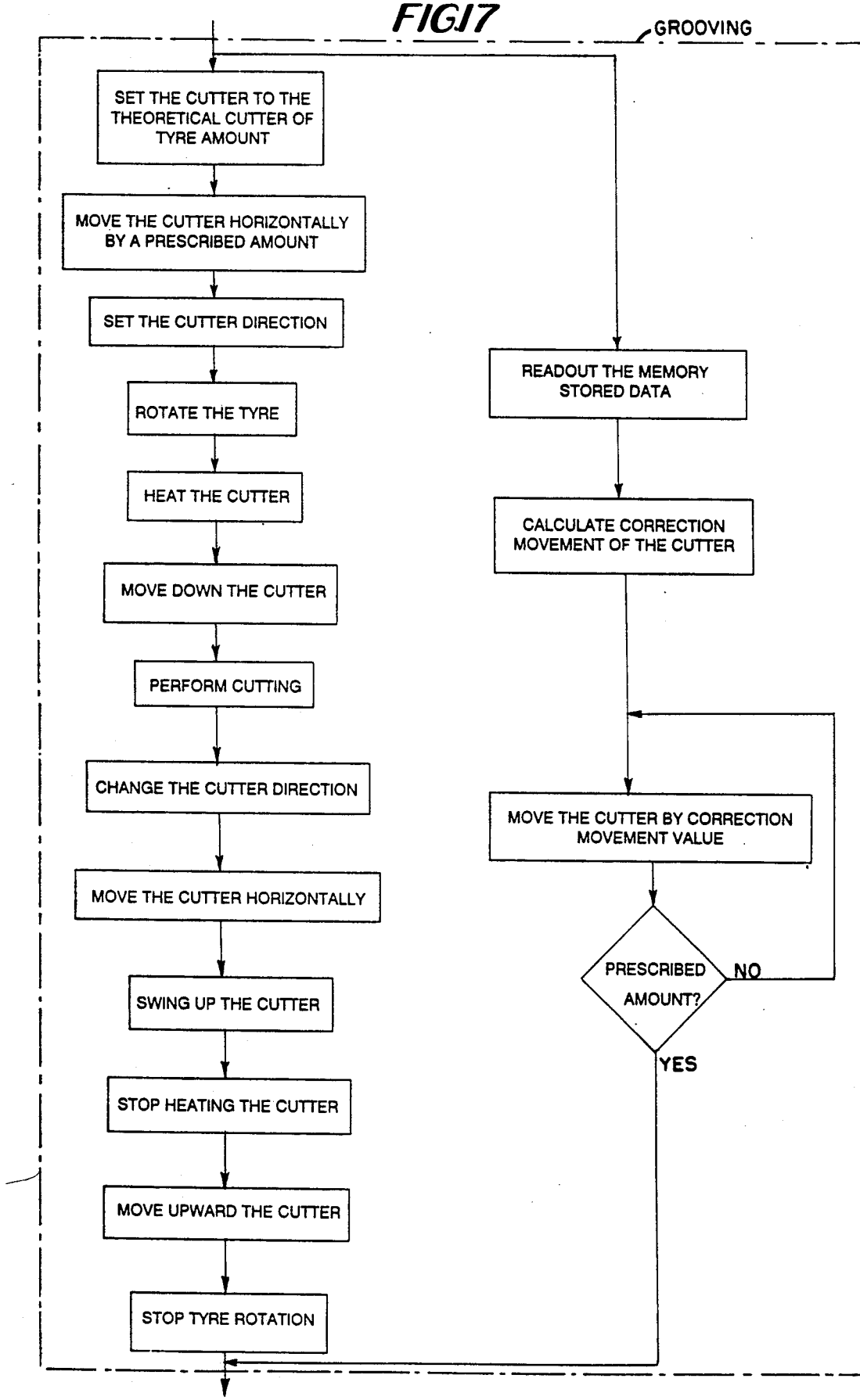

FIG. 17 is a detailed flow chart of the grooving step in FIG. 15. By way of example, if the detection marks are provided at 360 places on the circumference of the tire at equal intervals and the amounts of the center deviations among detection marks are linearly approximated according to the formula (II), the position of the tread center TC can be known with sufficient accuracy to avoid the practical trouble. Therefore, when there are a lot of places where the center deviation is detected as described above, it is not required to detect the lateral runout of the tire. Though the example for providing the detection marks at 360 places on the circumference of tire at equal intervals has been described, the number of the places where the detection marks are set is not limited to the above but can suitably be selected in consideration of the measuring accuracy, the workability and the like. However, if the detection marks are provided in at least two places, no practical trouble will occur.

FIG. 21 is an explanatory illustration of the construction of one embodiment of the device for driving the horizontally movable block 6. In the example shown in FIG. 21, the mechanism portion for standard movement comprises: a female screw body 65 having a driving gear 68 which is rotatably held by means of a bearing on the frame member 51 which is slidably provided over a pair of rails 42 mounted on the base 4; a driving motor 61 which is coupled to a ball screw shaft 62 which is engaged with the aforementioned female screw body 65 at one end thereof; and a supporting bearing 609 mounted on the base 4 for supporting the other end of the aforementioned ball screw shaft 62.

When the driving motor 61 is driven by the standard program, the ball screw shaft 62 is rotated and therewith the horizontally movable block 5 is moved by a required amount in the Y-axis direction. The mechanism portion for correction movement comprises: a supporting boss 66 where a plurality of splines are formed in the axial direction, which has a driving gear 67 held rotatably on the frame member 51 through a bearing; a spline shaft 64 which is slidably engaged with the aforementioned supporting boss; a correcting motor 63 which is coupled to one end of the spline shaft 64; and a supporting bearing 610 mounted on the base 4 for supporting the other end of the aforementioned spline shaft 64. Here, the aforementioned driving gear 67 is engaged with a driven gear 68.

When the correction motor 63 is driven according to the correction program in this state, the spline shaft 64 is rotated and the driving gear 67 is rotated. The rotation of the driving gear 67 causes the rotation of the driven gear 68. Thereby, the horizontally movable block 5 is moved by a predetermined correction amount. Because the spline shaft 64 is slidably engaged with the supporting boss 66, the movement of the horizontally movable block 5 by the standard program is not prevented.

Figure 22:
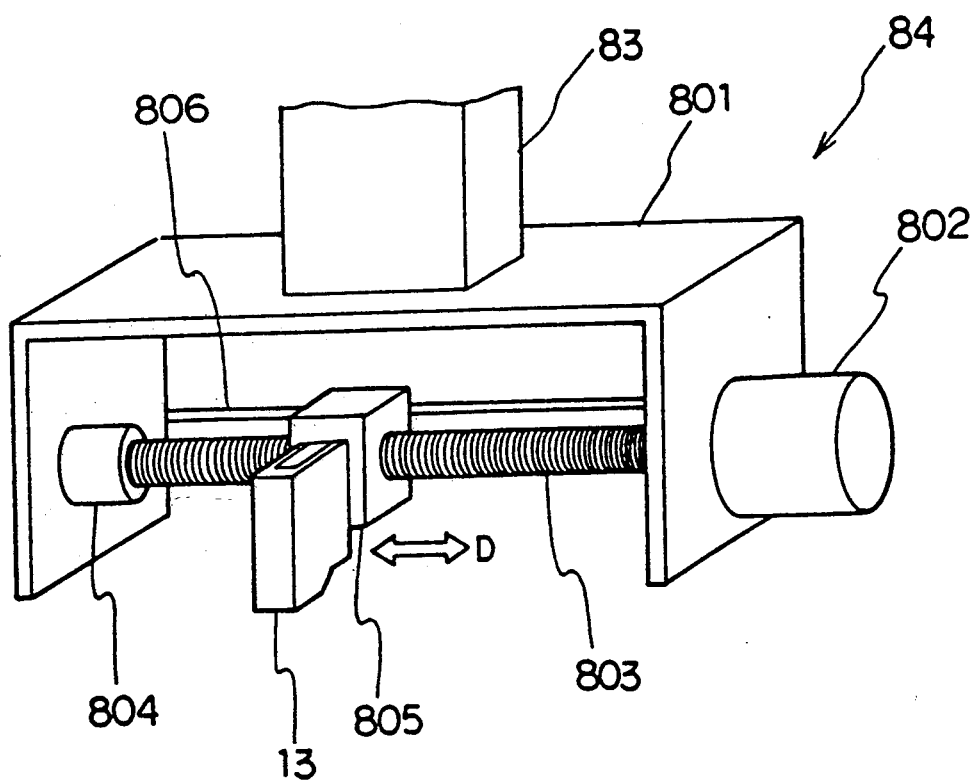
FIG. 22 is a schematic illustration of a device for moving a center deviation detector.

FIG. 22 is a schematic view of one embodiment of a device for moving the center deviation detector 84. In the embodiment shown in FIG. 22, the device for moving the center deviation detector 84 comprises: an ]-shaped frame member 801 fixed to the top of a bracket member 83 projecting from the approximately middle bottom surface of the rotating arm 81; a motor 802 provided on a side fragment of the aforementioned frame member 801; a scan shaft 803 connected to the driving shaft of the aforementioned motor 802 and including a ball screw or the like extended inside the ]-shaped frame member 801; a bearing material 804 provided on the inside surface of the other side fragment for rotatably supporting the end of the aforementioned scan shaft 803; a female screw body 805 which is engaged with the aforementioned scan shaft 803; and a guide shaft 806 provided between the aforementioned side fragments for preventing the aforementioned female screw body from being induced to rotate. The aforementioned female screw body 805 is fitted with the center deviation detector 13. When the motor 802 is driven, the female screw body 805 scans in the direction of the arrow D.

Next, the concrete example of the detection mark for the detection of the center deviation is described with reference to the drawings. The detection mark 32 is provided in an appropriate length in the peripheral direction as a small projection being about 1 mm in size, which is shaped through curing by a recess provided in a metal mould when curing the tire. The aforementioned mark 32 may be of any type which can be detected by the center deviation detector 13, and the recess may have any shape, for example, a shape of a concave groove. However, if it is too small, for example, is below about 0.5×0.5 mm, it is difficult detect. Furthermore, the detection mark may be provided in one place, or in some places intermittently on the full or a part of the periphery in a suitable length, or it may be continuously provided in the direction of the circumference. If the detection mark is provided in one place or some places, the rotational positioning of the tire is to be carried out at the time of the detection, but if it is continuously provided on the full circumference, the aforementioned positioning is not required. Moreover, the detection marks 32 are not always provided on the both sides of the tread center TC but the mark may be provided on only one side or only one mark may be provided in the position of the tread center TC by selecting 0 (zero) for the constant distance a.

Figure 23:
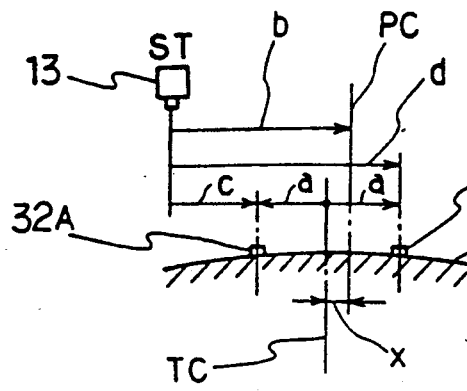
FIGS. 23 to 31 are explanatory illustrations of the examples of the method of detecting center deviation and FIG. 32 is a schematic illustration of a conventional grooving apparatus.

In the detecting method in FIG. 23, because the detection marks 32A and 32B are provided on both sides at a constant distance a from the tread center TC respectively, the distance b of the movement from the scan starting point ST to the tread center PC and the distance d of the movement beyond the tread center PC to the detection mark 32B are measured, and thereby the amount of the center deviation X can be calculated according to the following formula:

$$X = b - (d - a)$$

Figure 24:
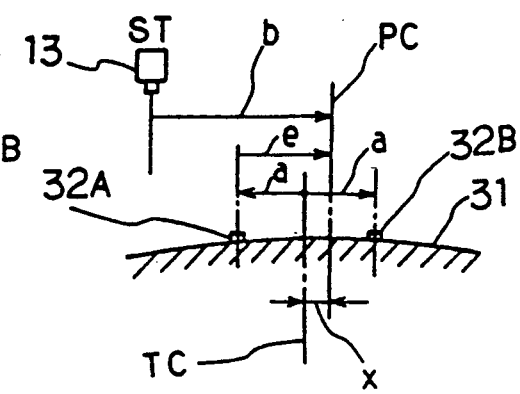

In the method for detecting deviations shown in FIG. 24, during the movement from the scan starting point ST to the tread center PC under the control of the standard program, the detection mark 32A is detected and then the amount e of movement up to the tread center PC is measured, and thereby the amount of the center deviation X can be calculated according to the following formula:

$$X = e - a$$

Figure 25:
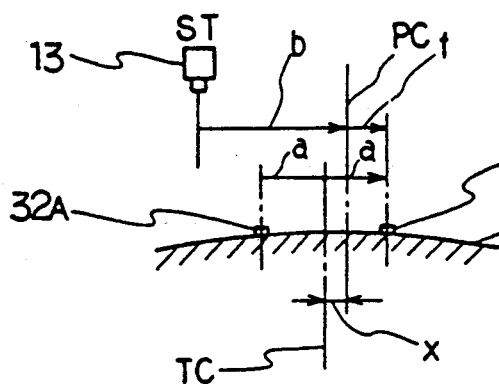

Moreover, in FIG. 25, the detection mark 32B, which is used, is provided on the side beyond the tread center PC set by the standard program, and the amount f of movement from the aforementioned tread center PC beyound the detection mark 32B is measured, and thereby the amount of the center deviation X can be calculated by subtracting it from a constance distance a.

$$X = a - f$$

Figure 26:
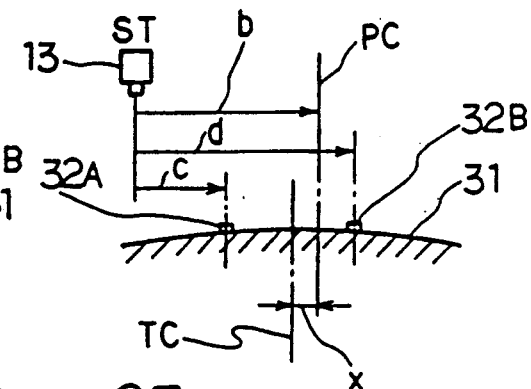
Figure 27:
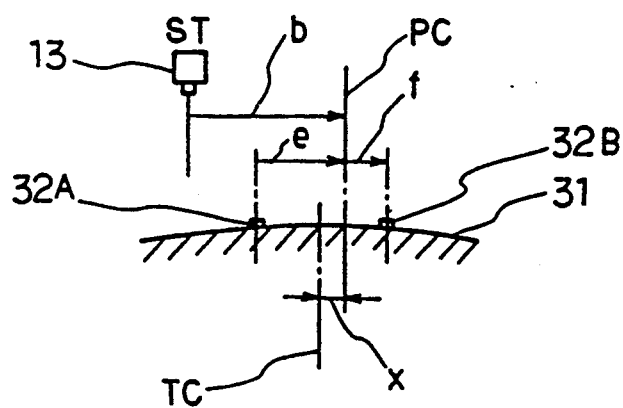

In an example of the method shown in FIGS. 26 and 27, the detection mark is provided at an appropriate certain distance and the mark can be detected even if the amount of the distance is unknown. In FIG. 26, the distance b of movement from the scan starting point ST to the tread center PC by the standard program, and the distances c and d of movement respectively up to the detection marks 32A and 32B are measured, and thereby the amount of the center deviation X can be calculated according to the following formula:

$$X = b - c - \frac{d-c}{2}$$

In FIG. 27, both the distance e, which represents the movement from the detection mark on the side of the scan starting point ST to the tread center PC set by the standard program, and the distance f, which represents the movement from the tread center PC to the other detection mark 32B, are measured, and thereby the amount of the center deviation X can be calculated according to the following formula:

$$X = (e-f)/2$$

Figure 28:
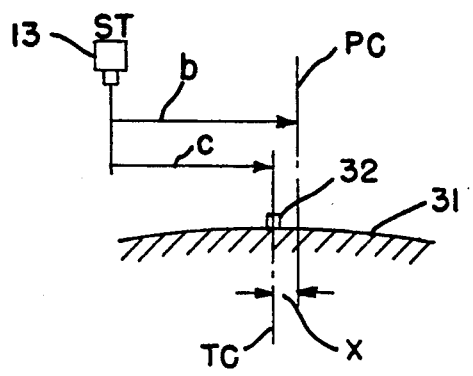

FIG. 28 shows the detecting method in the case that the constant distance a is 0 and one detection mark 32 is provided at the tread center TC of the tire, wherein the distance c of movement from the scan starting point ST to the detection mark 32 and a distance b of movement to the tread center PC by the standard program are measured, and the mount of the center deviation X can be calculated by subtracting the former from the latter according to the following formula:

$$X = b - c$$

Figure 29:
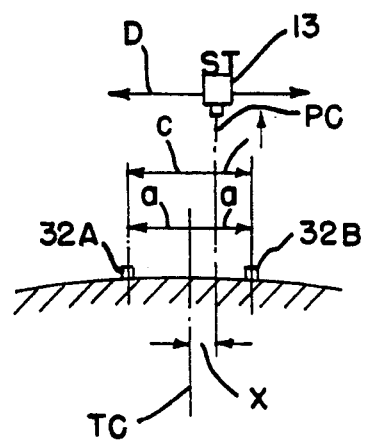
Figure 30:
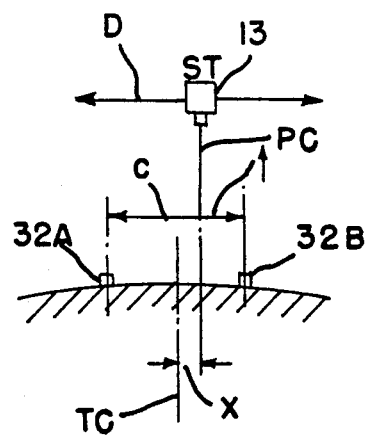
Figure 31:
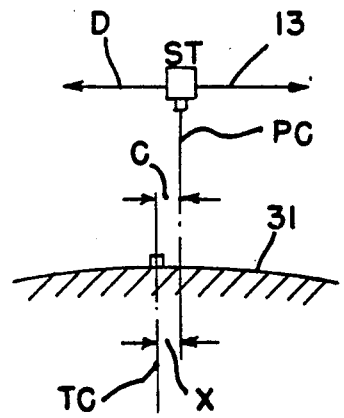
Figure 32:
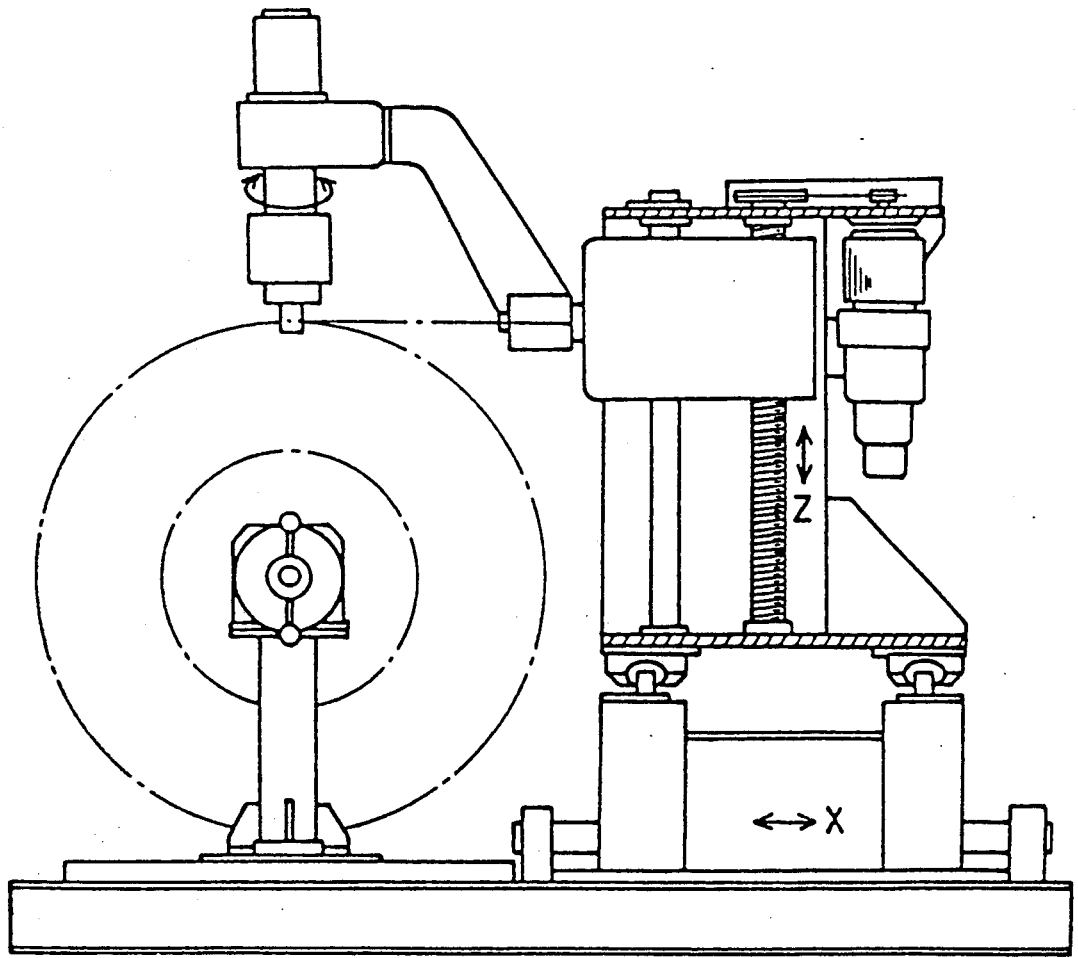

FIGS. 29, 30 and 31 show examples of the detecting methods wherein the center deviation detector 13 is scanned right-wards and left-wards from the position of the tread center PC prespecified by the standard program. FIG. 29 shows a case that the detection marks 32A and 32B are provided on both sides at a constant distance a from the tread center TC of the tire, wherein the amount of the center deviation X can be calculated by subtracting the aforementioned constant distance a from the distance c or f of movements from the scan starting point ST to the detection mark 32A or 32B by scanning:

$$X = c - a \text{ or } X = f - a$$

In the method shown in FIG. 30, the amount of the center deviation X can be calculated even if the constant distance a is unknown, wherein the center deviation detector 13 scans from the position of the tread center PC which is the scan starting point ST toward both sides and the distances c and f of movements to the detection marks 32A and 32B are measured, and the amount of the center deviation X can be calculated by finding the half of the difference therebetween according to the following formula:

$$X = (c-f)/2$$

Furthermore, in FIG. 31 the constant distance a is 0 and one detection mark 32 is provided at the tread center TC of the tire, wherein the center is deviated by a distance c detected from the scan starting point ST to the detection mark 32.

As described above, the present invention comprises: a horizontally movable block for moving a cutter in parallel with a tire support shaft; a vertically movable block for moving it in the up-down direction; and a detector for detecting the lateral runout of the tire and a detector for detecting the center deviation of the tire or only the latter. The detection marks provided on the tire tread surface are detected by means of the center deviation detector which is mounted on the support base capable of transversely moving in parallel with the tire support shaft and scans in the direction of the tire support shaft. The distance of movement from the scan starting point to the tread center PC set by the standard program is measured and the distance of movement from the scan starting point to the detection mark or the distance of movement from the detection mark to the aforementioned tread center PC is measured, and thereby the amount of the center deviation X is calculated based on these data. Therefore, even if the cured tire has a dimensional difference between right and left halves of its tread, or if the tire is deformed by the internal pressure, or if the tire is defectively engaged with a rim, the deviation between the tread center of the tire and the cutter supporting device can be simply and surely measured for each individual tire. Thus, the horizontally movable block and the vertically movable block described above are controlled with the amount of the standard movement, and additionally the value detected by the lateral runout detector is corrected based on the value detected by the center deviation detector, and thereby the position of the cutter which is set according to the aforementioned amount of the standard movements is corrected by driving a mechnism portion for correction movement of the horizontally movable block in response to the corrected amount of the correction movement. Therefore, even if the center deviation is caused by the lateral runout of the tire, or by the dimensional difference between right and left halves of its tread caused during the curing, or by the deformation due to the internal pressure, or by the defective engagement with the rim, the positions of grooves relative to the tread center of the respective tire can be rightly fixed in predetermined places. Furthermore, because the amount of the standard movement is always controlled by the value set by the standard program and the mount of the correction movement based on the detected value of the lateral runout and center deviation can be corrected by the separate correction program, the construction of the computer program can be simple and small in size, and therewith a uniform grooving can be carried out.

Moreover, it is considered that when the detection marks are provided on the both sides of the tread center, both center deviations are respectively detected by the detection marks on both sides. If different absolute values are obtained, such difference can be interpreted as a change of the relative positions of the detection marks to the tread center by the swelling deformation of the tire after the curing or the like. In that case the detection accuracy can be improved by obtaining the average value, and further the calculation can be made simpler by positioning the scan starting point to the tread center set by the standard program.

Furthermore, the detection mark provided on the tread surface may be a small one, and therefore the characteristic of the tire is not influenced, and there is another advantage that the center deviation detector can also be used as a device for detecting the longitudinal runout in the direction of the tire diameter.

We claim:

1. A tire grooving method of the present invention is for grooving a tire according to a standard program and is characterized by;
    (a) a step of detecting lateral runout of the tire.
    (b) a step of detecting center deviation of the tire.
    (c) a step of correcting a grooving position of a cutter in accordance with the detected values of lateral runout and center deviation.

2. A tire grooving method according to claim 1, wherein said grooving position of said cutter is corrected by a correction program provided independently to said standard program.

3. A tire grooving method according to claim 1 or 2, wherein
    (a) said step of detecting the lateral runout of the tire, and
    (b) said step of detecting the center deviation of the tire are performed before grooving.

4. A tire grooving method according to claim 1 or 2, wherein
    (a) said step of detecting the lateral runout of the tire is performed during grooving, and
    (b) said step of detecting the center deviation of the tire is performed before grooving.

5. A method for grooving a tire according to a standard program characterized by
    (a) a step of detecting center deviation of a tire at an interval of equal pitch around a full circumference, and
    (b) a step of correcting a grooving position of a cutter on the basis of the detected value of the center deviation.

* * * * *